US008623787B2

(12) United States Patent
Willen et al.

(10) Patent No.: US 8,623,787 B2
(45) Date of Patent: Jan. 7, 2014

(54) SUPERCONDUCTIVE MULTI-PHASE CABLE SYSTEM, A METHOD OF ITS MANUFACTURE AND ITS USE

(71) Applicant: NKT Cables Ultera A/S, Asnaes (DK)

(72) Inventors: Dag Willen, Klagshamn (SE); Chresten Traeholt, Frederiksberg (DK); Manfred Daumling, Alshausen (DE); Jerry C. Tolbert, Carrollton, GA (US); Mark Roden, Newnan, GA (US); David Lindsay, Carrollton, GA (US)

(73) Assignee: NKT Cables Ultera A/S, Asnaes (DK)

( * ) Notice: Subject to any disclaimer, the term of this patent is extended or adjusted under 35 U.S.C. 154(b) by 0 days.

(21) Appl. No.: 13/666,293

(22) Filed: Nov. 1, 2012

(65) Prior Publication Data

US 2013/0150246 A1 Jun. 13, 2013

Related U.S. Application Data

(62) Division of application No. 11/912,083, filed as application No. PCT/DK2006/050015 on Apr. 21, 2006, now Pat. No. 8,326,386.

(60) Provisional application No. 60/673,372, filed on Apr. 21, 2005.

(30) Foreign Application Priority Data

Apr. 25, 2005 (DK) ................................ 2005 00602

(51) Int. Cl.
*H01L 39/24* (2006.01)
(52) U.S. Cl.
USPC ......................................................... 505/431
(58) Field of Classification Search
USPC .......... 505/230–232, 430–431, 886; 174/15 S
See application file for complete search history.

(56) References Cited

U.S. PATENT DOCUMENTS

| 3,431,347 A | 3/1969 | Kapka et al. |
| 2002/0122637 A1 | 9/2002 | Anderson et al. |

(Continued)

FOREIGN PATENT DOCUMENTS

| CN | 1366310 A | 8/2002 |
| DE | 24 50 766 A | 10/1974 |

(Continued)

OTHER PUBLICATIONS

Bogner, "Superconducting Machines and Devices", Transmission of electrical energy by superconducting cables, Ed.S. Forrer and B. Schwartz (Plenum Publishing Co., 1974), pp. 430-431.

(Continued)

*Primary Examiner* — Colleen Dunn
(74) *Attorney, Agent, or Firm* — Pearen & Gordon LLP

(57) ABSTRACT

The invention relates to a superconductive multi-phase, fluid-cooled cable system comprising a) a cable comprising at least three electrical conductors constituting at least two electrical phases and a zero- or neutral conductor, said electrical conductors being mutually electrically insulated from each other, and b) a thermal insulation defining a central longitudinal axis and having an inner surface and surrounding the cable, said inner surface of said thermal insulation forming the radial limitation of a cooling chamber for holding a cooling fluid for cooling said electrical conductors. The invention further relates to a method of manufacturing a cable system and to its use. The object of the present invention is to provide a simplified manufacturing and installation scheme for a fluid cooled cable system. The problem is solved in that said cable—at least over a part of its length—is located eccentrically relative to said central longitudinal axis when viewed in a cross section perpendicular to said longitudinal axis and where the eccentric location has the function of accommodating thermal shrinkage and expansion of the cable with respect to the thermal insulation.

11 Claims, 11 Drawing Sheets

(56) References Cited

U.S. PATENT DOCUMENTS

| | | |
|---|---|---|
| 2003/0019660 A1 | 1/2003 | Spreafico |
| 2005/0056456 A1 | 3/2005 | Ladie et al. |

FOREIGN PATENT DOCUMENTS

| | | |
|---|---|---|
| DK | 43 40 046 C2 | 11/1993 |
| EP | 1 223 590 A2 | 7/2002 |
| EP | 1223590 A2 | 7/2002 |
| FR | 2 070 559 A | 9/1971 |
| JP | 63-264815 A | 1/1988 |
| JP | 8-017265 A | 1/1996 |
| JP | 09-134624 A | 5/1997 |
| WO | 03/001246 A2 | 1/2003 |

OTHER PUBLICATIONS

Tanaka, "Advanced Power Cable Technology—vol. II: Present and Future", (1983, CRC Press, Boca Raton, FL), pp. 242-259.

Sato, et al., IEEE Transactions on Applied Superconductivity, vol. 7, No. 2, 1997, pp. 345-350.

Leghissa, et al., IEEE Transactions on Applied Superconductivity, vol. 9, No. 2, 1999, pp. 406-411.

White, "Viscous Fluid Flow", McGraw-Hill, p. 127 (incl. Fig. 3-8).

SUPERCONDUCTIVE MULTI-PHASE CABLE SYSTEM, A METHOD OF ITS MANUFACTURE AND ITS USE

TECHNICAL FIELD

The present invention relates to AC or DC cables for power distribution.

The invention relates specifically to a superconductive multi-phase, fluid-cooled cable system. The invention furthermore relates to a method of manufacturing a cable system and to its use.

The invention may e.g. be useful in applications such as low, medium and high-voltage superconductive cables for power distribution.

BACKGROUND ART

Triax

[G. Bogner, Transmission of electrical energy by superconducting cables, in "Superconducting Machines and Devices", Ed. S. Foner and B. Schwartz (Plenum Publishing Co., 1974), pp. 430-431] and [T. Tanaka, A. Greenwood, Advanced Power Cable Technology—Volume II: Present and Future, (1983, CRC Press, Boca Raton, Fla.), pp. 242-259] describe a triaxial superconducting cable with three concentric phase conductors. The superconductors are applied to the surfaces of cooling ducts suspended in vacuum. The middle conductor is described as a double conductor, coating both sides of an annular cooling duct. The author indicates the difficulty to control the current distribution in the two conductors of Phase 2. This current distribution is desirable to eliminate eddy-current losses in the cooling duct inside phase 2. A common thermal insulation (cryostat) is concentric to the conductors. The electrical insulation is achieved by solid spacers, reflective foils and vacuum.

DE-43 40 046 describes a tri-axial AC cable with three concentric conductors and a common screen. The cable assembly is concentric with a thermal insulation. There are concentric central and annular cooling channels. In this way uniform cooling is achieved around the cable. The three phase conductors are made from ribbons of BiSrCaCuO in silver sheath. The cooling fluid in the form of liquid nitrogen can flow in the central and ring-shaped concentric cooling channels. The phase conductors are separated by a 10-50 mm thick layer of PE or polypropylene ribbons that form the electrical insulation. The insulation thickness between the third phase and the screen is only 60% of the insulation thickness between two phase conductors. The cooling medium travels out in the central cooling channel (50-200 mm Ø) and return in the ring-shaped annular cooling channel (150-500 mm). Due to the radial heat exchange between these two flows, the far end of this cable will experience an extreme temperature excursion, exceeding the temperature difference between the go and return flows. Some difficulty in manufacturing and transport would be expected due to a large dimension and weight of the cryostat with the cable assembled concentrically inside. The production and installation unit length of the electrical phase conductors becomes limited by the unit length of the cryostat. There is a technical difficulty in achieving the centering of the cable assembly while the cryostat is manufactured over the cable conductor assembly. However, there may have been a drive towards achieving centricity because in the case of a current imbalance, centricity is a cause of reduced eddy current loss in comparison with the eccentric position. In the described design, conductors consisting of BSCCO would overheat if exposed to over-currents frequently occurring in real power networks. If the silver sheath is made thicker, to act as a stabilizer, this cable design would become unattractively expensive.

Coaxial

Sato et al. (IEEE Transactions on Applied Superconductivity, Vol. 7, No. 2, 1997, pp. 345-350) describe a 3 phase HTS cable using BSCCO material for the conductors in a parallel, non-concentric configuration. Each phase comprises a former, a HTS-conductor, a $LN_2$ impregnated PPLP-insulator and a HTS insulation screen. Each electric phase has its own $LN_2$ centrally located cooling channel as well as a common 'outer' cooling channel formed by the corrugated tube system constituting the cryostat and surrounding the 3 separate phases. This design is dedicated to three-phase AC systems and requires HTS material for six times the ampacity (current rating) of one phase (three phases and three screens). In the case of a bi-polar DC system, a conform "two-phase" system would require HTS material for four times the phase ampacity (two phases and two screens), i.e. the described design principle requires 2N times the phase ampacity. The present invention requires from N times, up to N+1 times the phase ampacity of HTS materials, where N is the number of phases. The present invention only requires one former per N-phase system, $N<N+1<2N$ for $N>1$.

Leghissa et al. (IEEE Transactions on Applied Superconductivity, Vol. 9, No. 2, 1999, pp. 406-411) describe the development of a 110 kV/400 MVA coaxial 1-phase HTS model cable. The conductors are made of BPSCCO multifilament tapes and are electrically insulated by a high-voltage insulation of $LN_2$-impregnated synthetic tapes. The cable has a co-axial superconducting shield conductor. The cable core is housed in a flexible cryostat consisting of superinsulated corrugated tubes, and rests on the bottom of the inside of the cryostat without centering arrangements. A three-phase system can be constructed from three such single-phase, coaxial cable conductors inside a common cryostat or each in a separate cryostat. The cable is cooled with a closed-cycle $LN_2$ system.

Thermal Contraction Management

JP-09-134624A discloses a method of manufacturing a superconductive cable wherein the problem of managing the length change of the cable during large temperature changes (such as from room temperature to a low operating cryogenic temperature or vice versa) is solved in that the cable is fed into a thermal envelope during production and simultaneously cooled by liquid Nitrogen, the cable following a linear path in the thermal envelope. During a subsequent return to room temperature, the cable is confined to the same length and allowed to expand resulting in a nonlinear (e.g. snaking) path in the thermal envelope.

DISCLOSURE OF INVENTION

A problem of the prior art is that the manufacturing process for a fluid cooled cable system is complex and time consuming, with large materials use and relatively low efficiency during use.

An objective of the present invention is to seek to overcome one or more problems of the prior art as outlined above. A further objective of the present invention is to provide a simplified manufacturing and installation scheme for a fluid cooled cable system.

The objectives of the invention are achieved by the invention described in the accompanying claims and as described in the following.

A Superconductive Multiphase Cable System:

An object of the invention is achieved by a superconductive multi-phase, fluid-cooled cable system comprising a) a cable comprising at least three electrical conductors constituting at least two electrical phases and a zero- or neutral conductor, said electrical conductors being mutually electrically insulated from each other, and b) a thermal insulation defining a central longitudinal axis and having an inner surface and surrounding the cable, said inner surface of said thermal insulation forming the radial limitation of a cooling chamber for holding a cooling fluid for cooling said electrical conductors wherein said cable—at least over a part of its length—is located eccentrically relative to said central longitudinal axis when viewed in a cross section perpendicular to said longitudinal axis and where the eccentric location has the function of accommodating thermal shrinkage and/or expansion of the cable with respect to the thermal insulation.

In embodiments of the invention, 'a cable comprising at least three electrical conductors constituting at least two electrical phases and a zero- or neutral conductor' is to be understood as a cable having for example two electrical poles and a neutral (for the dc case) or three electrical phases and a screen/neutral/ground conductor (for a three-phase AC case).

In the present text, the term 'eccentrically arranged' is taken to mean in a NON-concentric arrangement, e.g. in the meaning that the resulting cable system is not circular symmetric (i.e. a cross sectional view of the cable system is only transferred into itself by a 360 rotation around the central longitudinal axis of the tubular thermal insulation). In other words, a central axis of the body constituted by the electrical conductors within the tubular thermal insulation (and their mutual electrical insulation and possible 'internal' cooling chambers/channels, together termed the 'cable') does not coincide with the central longitudinal axis of the tubular thermal insulation. In a given cross section, the eccentricity of a body relative to another body (here the cable relative to the inner or outer surface of the thermal envelope) is defined as the difference between the centres of the bodies relative to the radius of the largest body (assuming substantially circular cross sections; otherwise the eccentricity may be defined relative to a characteristic (e.g. largest or smallest) cross sectional dimension).

In an embodiment, the cable is located eccentrically relative to the central longitudinal axis substantially over its full length. In an embodiment, the eccentricity vary along the length of the cable system. Alternatively, the eccentricity may be essentially constant along the length of the cable system or a section of the cable system, In an embodiment, the inner surface of the thermal insulation (cryostat) is flexibly movable relative to the outer surface of the thermal insulation (cryostat). In an embodiment, the inner surface of the thermal insulation has a non-linear path, such as a meandering path, along the length of the cable system. This has the advantage that the cable may utilize the space of the cryostat even better in case of its compression at non-cryogenic temperatures (e.g. room temperature), cf. e.g. FIG. 11c.

Preferably, the eccentricity of the cable (having an outer diameter $D_{out,cable}$) relative to the inner surface of the thermal insulation (i.e. inner cryostat wall having a diameter $D_{in,cryo}$) defined as $1-(D_{out,cable}/D_{in,cryo})$ (i.e. $2*\Delta_{ex}/D_{in,cryo}$, cf. below) is in the range from 1% to 20%, such as from 5 to 15%. Preferably, the eccentricity of the cable relative to the outer surface of the thermal insulation (i.e. outer cryostat wall having a diameter $D_{out,cryo}$) is in the range from 1% to 50%, such as from 10% to 45%, such as from 20% to 30%.

In an embodiment, the eccentricity of the cable in a given cross section may be different at different temperatures of the cable.

In an embodiment, a superconductive multi-phase, fluid-cooled cable system comprises a) a cable comprising at least three electrical conductors constituting at least two electrical phases and a zero- or neutral conductor, said electrical conductors being mutually electrically insulated from each other, at least some of said electrical conductors being concentrically arranged around each other separated by an electrical insulation, said zero- or neutral conductor forming a common electrical return conductor, said cable system comprising a common electrical screen surrounding said electrical phases and said zero- or neutral conductor and being electrically insulated there from and b) a thermal insulation defining a central longitudinal axis and having an inner surface and surrounding the cable, said inner surface of said thermal insulation forming the radial limitation of a cooling chamber for holding a cooling fluid for cooling said electrical conductors, wherein the cable—at least over a part of its length—is located eccentrically relative to said central longitudinal axis when viewed in a cross section perpendicular to said longitudinal axis and where the eccentric location has the function of accommodating thermal shrinkage and/or expansion of the cable with respect to the thermal insulation in that $\Delta_{ex}$ being the average distance of a centerline of the cable to a centerline of the thermal insulation and being related to the longitudinal thermal contraction, $\in_L$ of the cable in the following way:

$$\frac{L_p}{2\pi}\sqrt{(\varepsilon_L + 1)^2 - 1} \leq \Delta_{ex}$$

the cable centerline substantially describing a screw-line inside the cryostat, $L_p$ being the pitch length of this screw line.

An advantage of an eccentrically located concentric multiphase cable system (e.g. triax) compared to an eccentrically located co-parallel (e.g. triad) system is that a larger former and phase diameter is possible (for the same inner diameter of the thermal envelope) resulting in lower magnetic fields and thus higher critical currents and thus lower AC-losses, again providing use of less materials and a more energy efficient cable system.

Ease of Assembly

An advantage of having a NON-concentric arrangement, e.g. in the form of a 'separate' cable comprising the conductors and a 'separate' (typically tubular) thermal insulation (e.g. a vacuum insulation tube, cryostat), is that these two 'individual elements' may be produced in parallel and joined in a simple way compared to the concentric build-up where spacers have to be mounted on the 'cable' before the tubular thermal insulation (e.g. a vacuum insulation tube) is produced around it. The absence of centering spacer arrangements facilitates the installation of the cable conductor assembly inside of the cryostat through for example pulling, pushing, or blowing of the cable conductor into the thermal insulation or threading of cryostat sections over the cable conductor. The NON-concentric solution thus has a potential for being economically favourable, logistically flexible and for saving manufacturing time and cost.

Reduction of Flow Resistance

The eccentricity of the location of the cable with respect to the thermal envelope further has the advantage of causing a reduction in flow resistance compared to the coaxial case (cf. e.g. Frank M. White in "Viscous Fluid Flow", McGraw-Hill, p. 127 (incl. FIG. 3-8)).

Optional Cables & Instrumentation

It has the further advantage of providing increased space within the thermal envelope for one or more optional other cables or components e.g. for monitoring or communication purposes.

Thermal Contraction

Further, the eccentricity offers a mechanism for compensating thermal contraction of the conductor in a longitudinal direction of the cable in combination with the already partly built-in compensation for the thermal contraction of the conductor.

Reliability

The reliability and availability of a superconducting cable system in a power network depends on the repair time of the cable system in case of failure. The most common cause of failure in cable systems is damage through external factors such as excavation work. It is therefore likely that the thermally insulating cryostat will be damaged. Since vacuum insulation is the most effective thermal insulation, it is likely that in the event of damage, the vacuum must be re-established in the cable through pumping. The pumping time is longer for longer pumping distances. It is possible to insert multiple pumping ports in long cryostats. In this invention however, the number of functionally integral cryostats is larger than the number of cable units. In this way, the cryostat length that needs to be re-established in case of a failure is reduced to half the length of the cable conductor assembly, or shorter. In this way, the pumping time and thereby the repair time can be reduced. Also, the number of pumping stations can be reduced. In one embodiment of the invention, the cable conductor assembly is longer than 1 km, the number of cryostat sections is larger than ten, and the number of pumping ports and pumping stations during repair following a digging damage is one. This results in a more reliable cable system with higher availability to the user.

DETAILED DESCRIPTION OF THE INVENTION

Definitions

In the present context the terms 'cable conductor assembly' or simply 'cable' are used for a part of the cable system comprising the electrical conductors and corresponding electrical insulation between adjacent electrical conductors (and optionally further layers related thereto). A cable system according to the invention thus comprises a 'cable' in the above sense and a thermal insulation surrounding the cable wherein the cable is eccentrically located relative to the central longitudinal axis of the thermal insulation (over at least a part of its longitudinal extension).

The terms 'low-, medium- and high-voltage' are in the present context taken to mean from 24 V to 6 kV, from 10 kV to 30 kV and from 50 kV up, respectively. A cable system according to the present invention is suitable for distributing voltages in the kV-regime, e.g. voltages in the range from 5 kV to 50 kV or above 50 kV, such as above 60 kV, such as above 100 kV.

In the present context, the term 'multi-phase' is taken to mean more than one electrical phase, e.g. two or three or more electrical phases.

The terms 'cryogenic envelope', 'thermal envelope' and 'thermal insulation' are used interchangeably for the structural elements surrounding the electrical conductors and their corresponding electrical insulation and protection layers (the cable), and forming a cooling chamber for holding a cooling fluid for cooling said electrical conductors.

In an embodiment, the cable constituted by electrical conductors (and their electrical insulation and possible 'internal' cooling chambers/channels) are located within the tubular thermal insulation to have a physical contact with the inner surface of the tubular thermal insulation, at least over parts of its length in the direction defined by the longitudinal axis of the thermal insulation.

The longitudinal direction of a cable system according to the invention is taken to mean the intended direction of power transmission of the cable system, e.g. as defined by the axis of the thermal insulation surrounding the cable.

The terms triax and triad configurations are used in the present application for cable configurations comprising three electrical phases in a concentric arrangement (triax, cf. 801 in FIG. 8*a*) and in a pyramid configuration (triad: $\circ^\circ_\circ$, cf. FIG. 8*b*), respectively.

Definition of Eccentricity:

The term 'eccentric' in relation to the location of parts in a given cross section of an object is taken to mean 'located elsewhere than at the geometrical centre of the object'. I.e. the 'cable' being located eccentrically relative to the 'thermal insulation' meaning that the geometrical centre of the 'cable' does not coincide with the geometrical centre of the thermal insulation.

The term 'eccentricity' is in the present context taken to mean the distance between, respectively, the centres of the outer or inner wall of the tubular thermal insulation and the cable, relative to the largest inner radial dimension (i.e. centre-to-wall) of the tubular thermal insulation (e.g. its radius, if internally circular) in a cross section perpendicular to the longitudinal direction.

FIG. 8 shows a fluid cooled high-voltage cable system according to the invention, FIG. 8*a* in a concentrically arranged 3 phase configuration with a common electrical screen and FIG. 8*b* in a side-by-side arranged three phase configuration with a common electrical screen.

FIG. 8 illustrates dimensional parameters of a cable system 800 according to the invention. The centres 840, 841 of the cable 801 and the thermal envelope 816, respectively are indicated by 'x'-es (the centres here being determined as the geometrical centres of the outer limitations of the cable and thermal envelope, respectively). Their mutual centre-to-centre distance is denoted $\Delta_{ex}$. The outer diameter $d_{cab}$ of the cable 801 and the inner diameter $d_{ce}$ of the thermal envelope 816 are indicated. The inner 8161 and outer 8162 walls of the thermal envelope 816 are indicated. In the present context, the eccentricity of the cable system is defined as the ratio of the centre-to-centre distance $\Delta_{ex}$ to the inner radius $d_{ce}/2$ of the thermal envelope. The eccentricity $E_x$ may thus be expressed as $E_x = 2*\Delta_{ex}/d_{ce}$.

Thermal Contraction

One of the purposes of an eccentric cable design is to accommodate the thermal contraction of the cable conductor assembly when cooled. This is in part achieved in this invention by introducing an over-length of the cable with respect to the thermal insulation in the warm (room-temperature, RT) cable system. The RT-over-length of the cable is designed in such a way that when the cable is cooled to its operating temperature, the cable and the cryostat have similar lengths without exceeding their respective mechanical constraints. In this example, the over-lengths in different approaches are quantified.

The capability to accommodate some over-length has been calculated for the following cases:

1) Cable conductor undulating like a sinusoid inside a straight inner cryostat wall
2) Conductor on an eccentric screw-line inside a straight inner cryostat wall
3) Cable and inner cryostat wall undulating together as sinusoids inside a straight outer cryostat wall
4) Conductor and inner cryostat wall on screw lines together inside a straight outer cryostat wall
5) Outer cryostat wall undulating like a sinusoid, up to 90° bends with the inner cryostat wall and the cable assuming extreme eccentric positions in the outer and inner bends.

The calculations were performed for a cable system with a cable conductor assembly having an outer diameter (OD) of 65 mm and a thermal envelope (cryostat) with inner diameter (ID) of 84 mm and an outer diameter of 150 mm.

The calculations were performed using the Excel spreadsheet software from Microsoft, U.S.A. The length of a sinusoid path, P, was estimated by the approximation $$P = \pi(a+b)\left(\frac{1+3h}{10+\sqrt{4-3h}}\right)$$

where $$a = \sqrt{\left(\frac{L_p}{2\pi}\right)^2 + \Delta_{ex}^2},$$

$$b = \frac{L_p}{2\pi}, \text{ and}$$

$$h = \frac{(a-b)^2}{(a+b)^2}.$$

$L_p$ is the pitch length, or the periodic length of the sinusoid, and $\Delta_{ex}$ is the amplitude of the sinusoid. The length of a screw-line was calculated as $$L = \sqrt{L_p^2 + (2\pi\Delta_{ex})^2}$$

The following are examples of these calculations:
1. A realisation of a 3 kA(rms) AC Triax cable case can resemble case #4 (screw lines) in combination with case #5 (bends). This will require that the cable conductor buckle to an eccentricity $E_x$ of 12-17%, corresponding to a $\Delta_{ex}$ of about 18-25 mm, with a pitch length, $L_p$, of 1.5 m to 3 m. The thermal contraction will be better accommodated if also the outer cryostat bends in several locations. This can also help the cable conductor to buckle. However, this may increase the pulling forces on the cable during assembly into the cryostat.
2. The ability to accommodate the thermal expansion requires a gap between the inner cryostat ID and the cable OD in the order of ~20 mm, while maintaining a mobility of ~20-25 mm of the inner cryostat inside the outer cryostat. In this way, the eccentricity of the cable can be up to $E_x$=30%, corresponding to $\Delta_{ex}$=(20+25)/2=22.5 mm.

In a particular embodiment, the cable has a physical contact with said inner surface of said thermal insulation at least over a part of its length as defined by said longitudinal direction. This has the advantage of no need for spacers.

In a particular embodiment, the cable has a physical contact with said inner surface of said thermal insulation in a location determined by gravity and mechanical constraints such as bending and thermal contraction. This has the advantage of avoiding the need for spacers, enabling separate assembly of cryostat and conductor/cable. Further, it makes possible the accommodation in part of the thermal contraction of the conductor.

In a particular embodiment, the eccentricity of the location of the cable relative to the central longitudinal axis of the tubular thermal insulation at least over a part of its length, preferably over a majority of its length, is larger than 5%, such as larger than 10%, such as larger than 20%, such as larger than 35%. The actually chosen eccentricity for a given cable design is a compromise between cross sectional size and necessary thermal compensation. The more eccentric, the more over-length applicable but also, typically, the larger cross section of the thermal envelope and thus the larger material consumption.

In a particular embodiment, the motion of the cable conductor assembly from one eccentric position to another eccentric position compensates for the thermal contraction and expansion experienced during cooling and warm-up of the cable or caused by an over-current or a fault current. This has the advantage that there is no need for extra compensation loops or other termination precautions, such as reinforced mechanical fixtures or rollers to enable a compensating movement of the terminations.

Radial Contraction

The cable conductor assembly of this invention can be constructed so as to reduce its longitudinal thermal contraction as compared to the inherent material properties of the superconductive elements and the normal-conductive elements. The electrically insulating layers may be loosely wound at a large pitch angle (40-90 deg) so that the radial thermal contraction when cooled becomes large, for example 1-5% when cooled from ambient temperature to 70 K. A further enhancement of the radial contraction can be obtained by a flexible layer underneath the dielectric layer. This flexible layer can be made from a porous polymeric material, or from wide (5-20 mm) flexible metallic or polymeric tapes that exhibit a spring-action. This large radial contraction accommodates a part of or the full longitudinal contraction of the metal and superconducting tapes in the cable, which could be for example 0.25%, 0.3% or 0.4%. This reduces the longitudinal contraction of the cable to for example 0.25%, 0.2%, 0.1% or 0%. The large radial thermal contraction can also be obtained in part by means of the fibre direction in the dielectric tapes. For example, fibre reinforced polymer can be almost neutral in longitudinal contraction and have a large radial contraction if the fibres are parallel with the axis of the cable. In this way, part of the thermal contraction of the components of the cable conductor assembly is accommodated through radial contraction, the remaining longitudinal thermal contraction being accommodated by the motion of the conductor assembly from one eccentric location to a second eccentric location.

Quantified Eccentricity

In an embodiment, the eccentricity of the cable relative to the central longitudinal axis of the tubular thermal insulation is larger than 5% such as larger than 10%, such as larger than 15%, such as larger than 20%, such as larger than 30%.

In a preferred embodiment of this invention, the center-to-center distance $\Delta_{ex}$ is related to the residual longitudinal thermal contraction, $\epsilon_L$ of the cable in the following way:

$$\frac{L_p}{2\pi}\sqrt{(\epsilon_L+1)^2-1} \leq \Delta_{ex}$$

$\Delta_{ex}$ is the average distance of the centerline of the cable to the centerline of the external cryostat. The cable centerline is describing a screw-line inside the cryostat. $L_p$ is the pitch length of this screw line.

In an embodiment, $\Delta_{ex}$ is related to the bending radius of the cable in the following manner:

$$\Delta_{ex} \leq \frac{R_{bend} L_p^2}{(2\pi R_{bend})^2 - L_p^2}$$

where $R_{bend}$ is the smallest bending radius where the cable properties survive, as determined by for example bending tests. This has the effect that the inner cryostat jacket (inner surface of the thermal envelope) does not impose any constraints to the meandering of the cable but that the outer jacket (outer surface of the thermal envelope)—and in particular the meandering and bends of the outer jacket—is exploited to the maximum or sufficiently to adapt the anticipated thermal contraction on cooling down the cable.

The term 'the smallest bending radius where the cable properties survive, as determined by for example bending tests' is in the present context taken to mean the minimum bending radius for which the cable maintains its basic properties such as $I_{c,max}$ (1 µV/m $I_c$ criteria, including that the cooling properties of the thermal envelope, etc. is not significantly altered) to at least 90%, such as to at least 95% after the cable has been subject to a given bending test (such as e.g. 1 µV/m $I_c$ criteria after 20× bends around a predefined minimum bending radius, $R_{min}$), such that the high voltage characteristics are retained according to the IEEE or CIGRÉ standards.

In an embodiment, the cable system is constructed so that the center-to-center distance $\Delta_{ex}$ fulfils both requirements $$\frac{L_p}{2\pi}\sqrt{(\varepsilon_L + 1)^2 - 1} \leq \Delta_{ex} \leq \frac{R_{bend} L_p^2}{(2\pi R_{bend})^2 - L_p^2}$$

In an embodiment, $L_p = nL_s, n > 1$ where $L_s$ is the longest stranded pitch length of superconducting tapes or wires in the cable and n is an integer.

The parameter n is selected larger than 1, such as equal to 2, or more preferably equal to 3. In the following table, possible examples of the invention are shown:

the construction to allow the formation of the required screw line without deterioration of their superconductive properties.

Concentric Phases—Materials Savings

In a particular embodiment, the zero- or neutral conductor forms a common electrical return conductor. This has the advantage of providing material savings compared with three individual neutrals/screens (ac case). In a particular embodiment, the zero- or neutral conductor is arranged concentrically around at least one of the electrical phases.

In a particular embodiment, at least some, such as all, of said electrical conductors are concentrically arranged around each other separated by an electrical insulation. This has the advantage of ease/simplicity of production providing the basis for a fast and low-cost production.

In a particular embodiment, the number of electrical phases is three. The superconducting triax concept is more favourable on many points in comparison with single phased superconducting cables and triad configured superconducting cables by virtue of the following features:
1) less material use
2) less cryogenic loss (compared with single phases)
3) favours eccentric configuration by lower flow resistance without increased eddy current losses because electromagnetically neutral (also at local scale in contrast to triad).
4) favours a combined compensation of axial thermal contraction by eccentricity (+ over-length) and built in material/radial adaptation of thermal contraction.
5) triax concept enables flexible adaptation to customer requests, production ease and dynamics, material flexibility, and the concept of form-fit-function for different HTS tape architectures.

Superconducting Material

The superconductive material used for the electrical conductors and optionally for the electrical screen may be of any appropriate kind optimised for the application in question (regarding loss, operating conditions, and cost) at the time of construction. In a particular embodiment, at least one of said electrical conductors comprises a superconductive material selected from the group of material comprising BSCCO (BiSrCaCuO$_3$), e.g. lead-doped BSCCO, YBCO (yttrium barium copper oxide), RE-BCO (Rare-Earth Barium-Copper-Oxide), MgB$_2$, Nb3Sn, Nb3Ti and combinations thereof. This has the advantage of utilizing known, well-tested and well-established products, in particular the characteristic of

| Example # | $L_s$ [m] | n | $L_p$ [m] | $\varepsilon_L$ | $R_{bend}$ [m] | Min [mm] | $\Delta_{ex}$ [mm] | Max [mm] | $OD_{cryo}$ [m] | $E_x$ [%] |
|---|---|---|---|---|---|---|---|---|---|---|
| 1 | 0.3 | 2 | 0.6 | 0.002 | 1.5 | 6.04 | 6.07 | 6.10 | 0.10 | 6.1 |
| 2 | 0.4 | 2.5 | 1 | 0.0025 | 1.2 | 11.26 | 14.67 | 21.49 | 0.12 | 12.2 |
| 3 | 0.3 | 3 | 0.9 | 0.003 | 1.7 | 11.10 | 11.63 | 12.16 | 0.15 | 7.8 |
| 4 | 0.4 | 3.5 | 1.4 | 0.0025 | 2 | 15.77 | 18.11 | 25.14 | 0.16 | 11.3 |
| 5 | 0.5 | 4 | 2 | 0.003 | 1.4 | 24.67 | 32.05 | 76.32 | 0.14 | 22.9 |

The advantage of such an embodiment of the invention is firstly that the eccentricity of the cable can accommodate the longitudinal thermal contraction, $\varepsilon_L$, of the cable from ambient temperature to the operating temperature of for example 4K, 9 K, 30 K, 50 K, 70 K, or 100 K. During cooling or warming, the cable changes from an eccentrically positioned screw line with pitch length $L_p$ to a screw line with pitch length $L > L_p$ or to an eccentrically positioned straight line. Secondly, the cable conductor assembly never bends to a radius smaller than the permissible bending radius. Thirdly, the HTS tapes of pitch length up to $L_s$ are able to glide inside being superconducting. It is of course advantageous to use HTS-materials that are superconductive at temperatures up to above the boiling point of nitrogen.

Former

In a particular embodiment, the concentrically arranged electrical conductors surround a volume which is centrally located relative to said concentrically arranged conductors. This has the advantage of being a simple concept, enabling the use of a central void for cooling, thermal inertia, diagnostics, and other means of information and physical transport.

In a particular embodiment, the centrally located volume is used as a cooling channel wherein cooling fluid flows.

In a particular embodiment, the cable comprises a central former in the form of a spiral, tube, corrugated tube or interlocked tube, made from metal, plastic or composite materials. This has the advantage of providing a physical carrier for winding/building the rest of the cable. It further provides the dimension-defining basis of the conductors. It may optionally be used for cooling. It may provide void/opportunity for optional addition of diagnostics, information or material transport.

Low AC loss

In a particular embodiment, the superconductive material is present in the form of tapes or wires arranged in such an order and at such pitch angles to give low electrical loss and increased thermal stability under alternating or transient currents by optimizing the number of superconductive tapes and the current distribution in the superconductive layers. This has the advantage of providing product flexibility (a certain degree custom of design being facilitated). It further facilitates the use of other pitches and in particular a variable amount of layers/tapes. Other parameters, such as more or less current carrying capability, more or less fault current protection, low or high voltage, AC or DC may be influenced/optimized.

In a particular embodiment, each electrical phase conductor consists of one or several layers of superconductive tapes, those layers being divided into one or more groups in each phase, each group containing one or several layers of tapes with the same pitch direction (designated "S" or "Z", where Z refers to a 'right-hand' winding and S to a 'left-hand' winding). In all of the first groups of each electrical phase, the layers have the same pitch direction.

In a first example, each phase conductor in a cable is composed of three layers of superconductive tapes. The first two layers in each phase conductor form a group with the same pitch direction, "S". The third layer in each phase conductor has the pitch direction "Z". This has the advantage of reducing the axial magnetic fields in the center of the cable. This reduces the eddy-current losses in any metallic parts of the cable and it reduces the impedance of the cable.

In a second example, each phase conductor in a cable consists of two layers of superconductive tapes. The first group of tapes in each phase consists of one layer with the pitch direction "Z". The second group of tapes in each phase conductor also consists of a single layer, but with a pitch direction "S". This has the advantage of making a more equal current distribution between the two groups in each phase.

In a particular embodiment, at least one of the electrical phase conductors has a last group of superconductive tapes or wires having the opposite pitch direction from the first group. This has the advantage of making a more equal current distribution between the two groups in that phase.

In a particular embodiment, each electrical conductor in a two-phase DC cable contains two superconductive layers of tapes or wires. The pitch direction sequence is SZ-SZ. This has the advantage of creating an even current distribution between layers during current surges, transients such as fault-currents or rapid current ramps of the DC cable. This results in a reduced transient loss and increased thermal stability of the DC cable.

In a particular embodiment, each electrical conductor in a three-phase triaxial AC cable contains two superconductive layers wherein the pitch direction sequence is SZ-SZ-SZ. This has the advantage of reducing the AC loss in the cable through an improvement of the current distribution between the different superconductive layers.

Over-Current Protection

In case of a short circuit in the network very large currents of many kA can occur in the electric network. If the superconductor in a superconducting power cable is exposed to such large currents which significantly exceed its critical current, the superconducting property and thus the virtually lossless transport of current in the cable are lost. All (or most) of this current must now be carried in the remaining metallic cross section of the power cable which can be rather small, much smaller than in conventional cables. Therefore rapid heating can occur, potentially leading to damage.

There are several ways to deal with this problem. One way is to simply increase the normal conductor cross section. This can be done by increasing the normal conductor to superconductor ratio in the superconducting tape, which in itself is a composite. This, however, requires modification of the tape design, which may not be readily possible or desirable for various reasons. Another solution to the problem is to add extra normal conductor (typically copper) to the cable that carries the current in the case of the loss of the superconducting properties of the superconductor. However, the difficult part is to place the copper in such a way that under normal operating conditions the cable current flows almost lossless in the superconductor, while under overload conditions current must commute over into the normal conductor. At the same time, induced losses due to eddy currents in the normal conductor must be minimized. One solution is for example by placing a normal conductor in the form of a copper braid into the centre of a single phase superconducting power cable. Under normal operating conditions the current is flowing in the superconductor due to its lower resistance and lower inductance. In the event of an over-current the resistance in the superconductor increases strongly and the current commutes over into the copper braid. However, in the multi-phase superconducting cable described in this invention, this solution is not possible for all phases due to its geometry. Placing copper in the centre is possible for the centre phase only, while the extra normal conductor for the other phases must be located at their respective voltage levels.

In this invention, extra layers containing a normal conductor (or extra superconductor) can be added to each phase of the multi-phase power cable for over-current protection. The currents in the layers are controlled by winding all layers with a specific pattern so that under normal operating conditions current is flowing in certain layers (which contain the superconductor) but not in others (typically containing normal conductor). Winding the layers with a specific pattern controls the self and mutual inductances of the layers and their resistances so that induced currents in the layers where no currents are desired cancel themselves to zero or reduce themselves to acceptable values. Minimizing local magnetic fields aside from balancing tangential and axial components is also a possible avenue. In the case of an over-current, the increased resistance in the superconductor causes the current to commute into the normal conducting layers.

The task is to design the layer current distribution in a multi-phase cable containing extra normal conductor layers (typically copper or aluminium) for over-current protection. In normal operation, as much as possible of the current is to flow in the layers containing the superconductor, while in the event of a short circuit the current is to pass over into the normal conduction copper layers.

In the case of a three-phase AC cable, the design principles can be summarized as follows:

The inner phase is influenced by the cumulative axial (but not tangential) field produced by the middle and outer phase. If there is no such axial field then the influence of the outer and middle phase on the inner one is minimal. On the other hand the outer phase will only be influenced by the tangential field produced by the middle and inner phases. The middle phase experiences both a tangential field from the inner phase, and possibly also an axial field from the outer phase.

The axial field a phase produces can be minimized if the current carrying layers containing the superconductor have roughly equal winding pitch, but are wound in opposite direction. The end result is that there is no or only a very small axial magnetic field in the centre, where the normal conducting layers for the inner phase can be placed. This results in no induced currents in these innermost copper layers, virtually regardless of what their winding pitch (and cross section) actually is. An analogue can be made for the outside layers—except it is the tangential field which is zero or close to zero in this case (for balanced 3 phase current), allowing placement of normal layers for the outer phase there. In the middle phase S, zero or a small magnetic field can be created in its centre only by allowing a complete shielding current (180 degrees off in phase to phase T or R, respectively) to flow in each current carrying layer directly adjacent to the respective phases, creating a field free, or nearly field free space in the middle of phase S. However, this requires an increased amount of superconductive material in Phase S, up to twice the nominal phase ampacity.

It is also possible to find a solution in which normal conducting layers are placed in positions where there is a magnetic field, but where the induced voltages balance so that very little current is flowing in the normal conducting layers. In such a balanced solution very little current is generated in some layers even if they contain superconductors (R=zero). One such solution was found. In this solution, shown in FIG. 3, the two normal conducting layers of the S-phase (item 213') are placed on the inside, and on the outside of the two superconducting layers (item 213), respectively. The normal conducting layers in the middle phase are exposed to a small axial field stemming from phase R, and a tangential field stemming from the sum of the currents in phases S and T. Thus the two fields are 180 degrees out of phase, thus simply opposite in sign. The inner normal conducting layer of phase S is exposed to the tangential field from phase T, and the combined axial field from phases S and R. Again, these two fields are 180 degrees out of phase. In order to obtain the least amount of current in the normal conductors their winding pitches must be such as that the voltage induced by the tangential flux is compensated by the voltage induced by the axial field. A shorter pitch in the normal conducting layers leads to less current in these normal conducting layers due to better compensation voltages induced by the axial and tangential fields.

Preferred embodiments include
- even number of layers per phase for both normal and superconducting layers
- placement of normal conducting layers outermost for outer phase
- placement of normal conducting layers innermost for inner phase
- placement of normal conductive layers on each side (inside and outside) of the middle phase
- interleaving of superconducting and normal layers for inner and outer phases
- +− pattern for current carrying layers in all phases together with roughly equal pitch length for current carrying layers in each phase (low axial field)

In a particular embodiment of the invention, at least one of the electrical conductors is in thermal and/or electrical contact with a layer of a protective electrically conductive shunt material, e.g. in the form of tapes or wires comprising Cu or Al. This has the advantage of facilitating the integration of a predetermined fault current rating in the cable/conductor design.

In a particular embodiment, the electrically conductive shunt material is in thermal and electrical contact with a semi-conductive bedding material and/or with the superconducting tapes, arranged to be dispersed in at least one of the layers of superconducting tapes. This has the advantage of providing production and material flexibility, allow for form-fit function, and protecting the superconductive material against fault currents. In a particular embodiment, the electrically conductive shunt material is in thermal and electrical contact with a semi-conductive bedding material and/or with the superconducting tapes, arranged in one or several layers separate from the layers of superconducting tapes. This has the advantage of minimising possible eddy current dissipation. The shape of the tapes of the shunt layer or ride-ups in the shunt layer thereby has less impact on the HTS layer and vice versa. Further, it provides thermal inertia in case of fault current power dissipation.

In a particular embodiment, at least one of the electrical conductors is in thermal and/or electrical contact with a semi-conductive material, e.g. in the form of a bedding tape. This has the advantage of providing a thermal inertia to absorb dissipated power in case of fault current.

In a particular embodiment, the superconductive tapes or wires and said conductive shunt tapes or wires are arranged in such an order and at such pitch angles as to give low electrical loss under alternating or transient currents by optimizing the number of superconductive tapes or wires and the current distribution in the superconductive layers, and by minimizing the fraction of the nominal current in the conductive shunt layers, while arranging that in the case of a fault current, the conductive shunt layers act as protective shunts. This has the advantage of avoiding the need for specially designed HTS tapes with integrated shunt protection. More flexibility in the choice of materials and production and the ability to adapt to customer requests are provided.

Mechanical Reinforcement

In a particular embodiment, at least one of the electrical conductors is reinforced by mechanically strengthening components containing steel alloys, bronze, brass alloys, carbon-fibre-based members or Poly-Imid-based members. This has the advantage of improving the robustness of the conductor, whereby less concern towards cautious handling is necessary. Further, the cable can be pulled into ducts in longer lengths.

Dielectric

Solid Dielectric

In a particular embodiment, the electrical insulation between the electrical conductors and between the electrical conductors and the electrical screen is made of polymers, such as PPLP, PE, polypropylene, paper, including synthetic paper applied by extrusion or through the application of ribbons.

In particular embodiments, the electrical insulator(s) and/or the electrical conductor(s) are integrated with mechanically reinforcing means such as fibers or tapes.

Thickness

The thickness of the insulation (and in the case of ribbons the thickness and the number of ribbons), the choice of insulating fluid and the operational pressure is selected according to the desired insulation properties (Basic Insulation Level, BIL, tested by means of impulse voltages, nominal voltage, tested by means of direct or alternating voltages over time).

Dielectric Fluid

In a particular embodiment, the electrical insulation comprises a pressurized, electrically insulating fluid element such as liquid nitrogen, nitrogen gas, helium, neon, hydrogen, oxygen or combinations thereof. This has the advantage of providing a high dielectric strength and therefore a compact electrical insulation system, and an increased heat conductivity compared to vacuum or low-pressure gases.

Pressure Membrane/Pressure Tube

In a particular embodiment, the electrically insulating fluid is separate from the cooling fluid circulated inside the thermal insulation surrounding the cable. This has the advantage of making it possible to retain a difference in insulation fluid/gas and/or pressure, temperature and flow. It is thereby possible to keep insulation impregnation clean/pure while having a cooling agent with lower degree of purity. In some publications it is proposed to cool with hydrogen in order to use the transported hydrogen as distributed fuel, in this case it is still wise to retain nitrogen or helium as insulation impregnant.

In a particular embodiment, the insulating fluid is separated from the cooling medium through a pressure membrane that prevents the cooling medium from entering the electrical insulation. This pressure membrane can be an impermeable pressure container made from a metal or an artificial material, or it can be a permeable layer in the cable, for example one or several layers of bedding tapes exposed to an internal cable pressure that is higher than the external pressure. As an example, the insulation fluid may be pure $N_2$ or pure He, while the cooling fluid is He-gas OR liquid air being locally introduced OR a solid/liquid mix containing parts having e.g. a relatively large heat capacity.

In a particular embodiment, the central part of the cable in whole or part is used to communicate the internal overpressure of the electrically insulating fluid. In other words, the central part of the cable is not used for the transport of cooling fluid. This has the advantage of protecting the cryostat from overpressure.

In a particular embodiment, the electrically insulating fluid is identical to the cooling fluid. In an embodiment, the electrically insulating fluid and the cooling fluid are kept at similar pressure, e.g. that of liquid $N_2$. In a particular embodiment, the common electrically insulating fluid and cooling fluid have an increased purity (compared to the situation of two separate fluids) whereby conductive or dielectric contamination is minimized.

Closed Former

In a particular embodiment, the centrally located cooling volume is closed at each end to form a thermal reservoir. This has the advantage of necessitating a minimum concern to the purity (sorted out once) as there is no external material exchange with the closed volume. A further advantage is a local smoothing of the temperature gradient due to small axial convection.

Electrical Screen

Al, Cu or SC

In a particular embodiment, the common electrical screen comprises Cu, Al or another conventional conductor or a superconductive material or a combination of said materials. This has the advantage of providing flexibility in the choice of materials and in production.

Mechanical Reinforcement

In a particular embodiment, the electrical screen comprises Al or Cu, optionally comprising semi-conducting material and/or superconducting material and/or high-strength mechanical reinforcement materials e.g. in the form of steel grades, nickel grades, bronze, brass alloys, carbon or kevlar fibres or high-strength composite tapes. This has the advantage of providing a stronger reinforcement, a more robust cable and the potential of less sensitive handling and to provide that a relatively longer conductor section can be pulled through a cryostat/duct.

Low-Friction Layer

In a particular embodiment, the electrical screen is provided with a low friction component. In one embodiment, e.g. every n'th tape/wire of the electrical screen is provided with a low friction coating or is replaced by a low friction tape of a larger dimension [thickness/radial direction] than the conductive tape/wire [so that the low friction material (e.g. Teflon™ from DuPont, polypropylene, nylon, or polyethylene) has the physical contact with the interior of the thermal envelope]. This has the advantage of facilitating the introduction of the cable into the thermal envelope.

In a particular embodiment, the electrical screen has a coating or one or several applied separate layers of a low friction material to facilitate the introduction of the 'cable' into the thermal envelope without substantially increasing the weight of the cable system. The low friction material is made from wide tapes with a large pulling strength. Each tape contains several filamentary components so that the breakage or wear of one filamentary component will not lead to the breakage of the whole tape. The low-friction tape can be fabricated from woven nylon or polypropylene or polyacetate, from a braid of multiple Teflon strands, or from mixes of these materials. The number of low-friction tapes is lower than the number of conductive elements in the screen, e.g. 4, 3 or 2 or 1. In an embodiment, the low friction tape or layer has a coefficient of friction <0.25 against the inner surface of the thermal envelope, such as a coefficient of friction in the range from 0.14 to 0.22.

A Method of Manufacturing a Superconductive Single-Phase or Multi-Phase Cable System:

Single-Phase or Multi-Phase

An object of the invention is further achieved by a method of manufacturing a superconductive single-phase or multi-phase, cable system comprising the steps of a) providing at least two electrical conductors in the form of at least one electrical phase and a zero- or neutral conductor, b) providing that said electrical conductors are mutually electrically insulated from each other c) providing a thermal insulation surrounding the electrical conductors, said tubular thermal insulation defining a central longitudinal axis d) providing that the inner surface of said tubular thermal insulation forms the radial limitation of a cooling chamber for holding a cooling fluid for cooling said electrical conductors and providing that said at least one electrical phase and a zero- or neutral conductor are arranged eccentrically relative to said central longitudinal axis.

The method has the same advantages as the cable system described above.

In an embodiment, the inner surface of the tubular thermal insulation is flexible and movable relative to the outer surface of the thermal insulation.

In an embodiment, a multi-phase cable system is provided in that at least three electrical conductors in the form of at least two electrical phases and a zero- or neutral conductor are provided in step a). In an embodiment at least four electrical conductors in the form of at least three electrical phases and a zero- or neutral conductor are provided in step a).

Eccentricity & Thermal Contraction

In a particular embodiment, the method further comprises the step of e) providing a solution for the difference in thermal contraction between the cryostat and the conductor by a conductor over length mediated by the eccentricity combined with a built in partially radial adoption of the axial contraction.

In an embodiment, the eccentric arrangement of the cable is adapted to compensate for the thermal contraction and expansion (e.g. in the order of ±0.2-0.3%) experienced during cooling and warm-up of the cable or caused by an over-current or a fault current.

In an embodiment, the eccentric arrangement of the cable in combination with a radial adoption (1-2%) provides the compensation for the longitudinal thermal contraction and expansion (e.g. in the order of ±0.2-0.3%) experienced during cooling and warm-up of the cable or caused by an over-current or a fault current.

Pull, Cool, Pressurize, Push

In an embodiment, the method comprises at least two of the following steps after having provided separate cable and thermal envelope units:

S1. Applying a tensile stress to the thermal envelope thereby stretching it in its longitudinal direction by 0.05-0.5%;
S2. Cooling the cable to the temperature of the cooling fluid thereby causing a contraction of the cable by 0.05-0.5%;
S3. Pressurizing the inside of the thermal envelope to 0.5-40 bars overpressure, thereby causing the inner cryostat wall to elongate;
S4. Forcing the thermal envelope to meander or bend in multiple locations along its length, such as every 1.5 m or every 3 m or every 10 m
S5. Pushing the cable into the thermal envelope using 0.1-10 kN force;
S6. Fixing the cable ends to the ends of the thermal envelope;
S7. Subsequently releasing the pressure from the thermal envelope;
S8. Subsequently releasing the tensile stress on the thermal envelope;
S9. Subsequently allowing the cable to warm up, whereby the cable expands in its longitudinal direction;
S10. Stop pushing the cable into the thermal envelope.

Through these process steps, or any combination of two or more of the listed process steps, the cable is caused to undulate (meander, bend periodically back and forth) inside the thermal envelope in multiple bends, such as along a sinusoid-like curve, or in a screw-line curve. By pushing in the conductor this will, depending on the stiffness/flexibility and limited by the inner cryostat walls and the mobility of the inner cryostat walls with respect to the outer cryostat walls, accumulate an over length of conductor with respect to the cryostat length. The number of bends/meanders can be averaged to a certain number per unit length depending on material/conductor characteristics, for example 1000 per km, 700 per km, 500 per km or 300 per km. Further, the meandering can be controlled to adapt to the shape of a spiral through the cryostat space if a slight twist is added on the pushing in procedure.

In an embodiment, the method comprises the steps S1, S6, S8. This has the advantage/effect of ensuring that the cable not only is forced to meander within the constriction of the inner cryostat wall but also exploit the fact that the cable is also able to force the inner cryostat to meander and/or to adopt the longest possible or sufficiently long path in order to allow for compensation of the anticipated thermal contraction.

In an embodiment, the method comprises the steps S2, S6, S8. This has the advantage/effect of ensuring that the cable not only is forced to meander within the constriction of the inner cryostat wall but also exploit the fact that the cable is additionally able to force the inner cryostat to meander and/or to adopt the longest possible or sufficiently long path in order to allow for compensation of the anticipated thermal contraction.

In an embodiment, the eccentricity of the cable relative to the inner surface of the thermal insulation (i.e. inner cryostat wall) is arranged to be in the range from 1% to 20%, such as from 5 to 15%. In an embodiment, the eccentricity of the cable relative to the outer surface of the thermal insulation (i.e. outer cryostat wall) is arranged to be in the range from 1% to 50%, such as from 10% to 45%, such as from 20% to 30%.

Separate Manufacturing

In an embodiment, the electrical conductors, mutual electrical insulation and possible intermediate cooling channels or chambers (termed the cable) is arranged to be manufactured separately from—optionally in parallel with—the thermal insulation. This has the advantage that the two parts of the cable system may be manufactured at different locations and/or at the same or different points in time and/or by different vendors. The parallel work on the cable conductor assembly and on the cryostat reduces lead times, and inventory costs.

In an embodiment, the cable and the tubular thermal insulation are assembled in a separate manufacturing step. The separate transport of the conductor assembly and the cryostat allows longer unit lengths of the cable conductor assembly to be made, for example longer than or equal to 500 m, such as longer than or equal to 1000 m or such as longer than or equal to 2000 m, whereby fewer splices are necessary in a cable system. This reduces the cost and increases the reliability of the cable system.

Standardized, Modular Parts

Further, one of the parts (e.g. the tubular thermal insulation) may be a standardized, modular part, while the other is a customized part.

In a particular embodiment, the thermal insulation is provided in sections of standardized lengths, such as 3 m or 6 m or 12 m or 20 m or 50 m or 100 m or 200 m. In an embodiment the unit length of the thermal insulation is different from the unit length of the cable, e.g. smaller. In an embodiment, the cable and the thermal insulation are manufactured in separate sections of length $L_{cab}$ and $L_{TE}$, respectively, wherein $L_{cab}$ is larger than $L_{TE}$. In an embodiment, two or more standardized lengths of thermal insulations are assembled with one unit length of the cable. This has the advantage of providing a flexible scheme for a manufacturing process taking advantage of standardized or semi-standardized production of basic parts of the cable system. It further opens up for a conglomerate of vendors bidding for parts or complete systems. In an embodiment, $L_{cab}$ is substantially equal to $n*L_{TE}$, where n is larger than 1, such as larger than 2, such as larger than 4, such as larger than 7, such as larger than 10, such as larger than 100.

In a particular embodiment, the thermal insulation is provided as a mixture of flexible, rigid straight and rigid bent sections, or sections that are partially rigid and partially flexible. This has the advantage of improving flexibility with respect to customer requirements and with respect to vendors of thermal insulation and to a certain degree provides independence of conductor design.

Use of a Superconductive Multiphase Cable System:

Use of a superconductive multiphase cable system as described above and as defined in the claims or manufactured by a method as described above and as defined in the claims is moreover provided by the present invention. Thereby it is ensured that the user is provided with a more compact and less costly cable system than would otherwise be possible. An increased reliability will result from the capability to accommodate multiple thermal cycles and over-current events.

Increased flexibility results from the capability to convert the system from AC to DC operation.

In a particular embodiment, the multiphase cable system is used as a DC-cable system. This has the advantage of enabling a [+, −, 0]-configuration that together with converter stations may have a common neutral with its neighbouring AC system.

In a particular embodiment, the phase configuration is [+, −, 0]. This has the advantage that ground and 0 has little potential difference, thereby improving safety.

In a particular embodiment, the phase configuration is [+, −, neutral, 0]. This has the advantage that 0 can be grounded.

In a particular embodiment, the multiphase cable system is used as an AC-cable system. This has all the benefits of reduced weight, ease and flexible production, compactness, lowest material cost, etc.

In particular embodiments, the multiphase cable system is used as a triax AC-cable with phase configurations such as [R, S, T] or [S, R, T], etc.

In a particular embodiment, the multiphase cable system can be used as both an AC-cable system or a DC cable system without any change at all of the cable design. This has the advantage of rational production, i.e. no change of any parameters for two different orders. It also has the advantage of enabling an AC to DC switchover by the electrical system operator, after the superconducting power line has been installed.

In a particular embodiment, the multiphase cable system can be used to transfer electricity simultaneously through AC and DC, with the two frequencies being separated out at each end of the cable system using AC/DC converters and transformers. This has the advantage of flexible and efficient use by the electrical system operator, after the superconducting power line has been installed.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIGS. 9a-9c show a method of manufacturing a cable system according to the invention, FIGS. 9a-9c being cross sectional views of the thermal insulation, the cable and the assembled cable system, respectively, FIGS. 10a-10b schematically show cross sectional views of the thermal envelope or cryostat, FIG. 10a showing a transverse cross section and FIG. 10b a longitudinal cross section where the inner cryostat wall is curved, representing a situation during installation, and FIGS. 11a-11c schematically illustrates process steps that introduce a longer length of cable conductor assembly into multiple sections of functionally integral thermal envelopes. The additional length is achieved through cooling of the cable conductor, through pulling in the ends of the thermal envelope, through pushing of the cable conductor into the thermal envelope, and through the application of pressure inside the inner cryostat wall.

Figure 1:
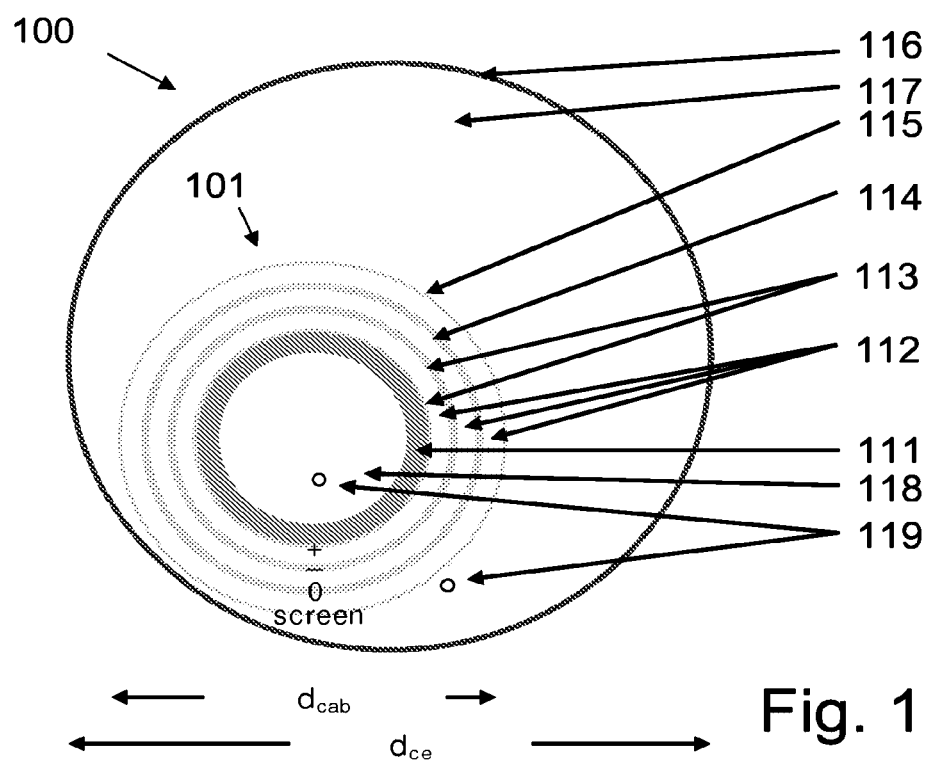
FIG. 1 shows a cross-sectional view of triaxial DC cable system according to the invention in a [+, −, 0, screen]-configuration.

The figures are schematic and simplified for clarity, and they just show details which are essential to the understanding of the invention, while other details are left out. Generally, the same reference numerals are used for identical or corresponding parts except for a preceding numeral referring to the figure number where the feature in question is shown (e.g. the thermal or cryogenic envelope is referred to as 116 in FIG. 1, as 216 in FIG. 2., etc.).

MODE(S) FOR CARRYING OUT THE INVENTION

Example 1

A DC Cable

Figure 2:
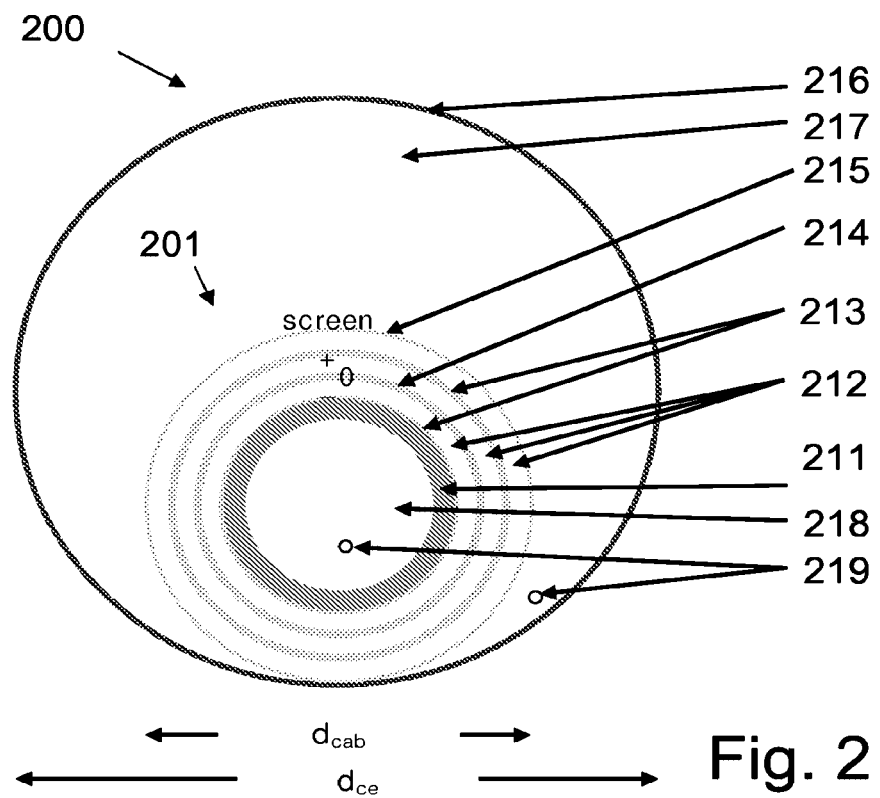
FIG. 2 illustrates a cross-sectional view of triaxial DC cable system according to the invention in a [−, 0, +, screen]-configuration.
Figure 3:
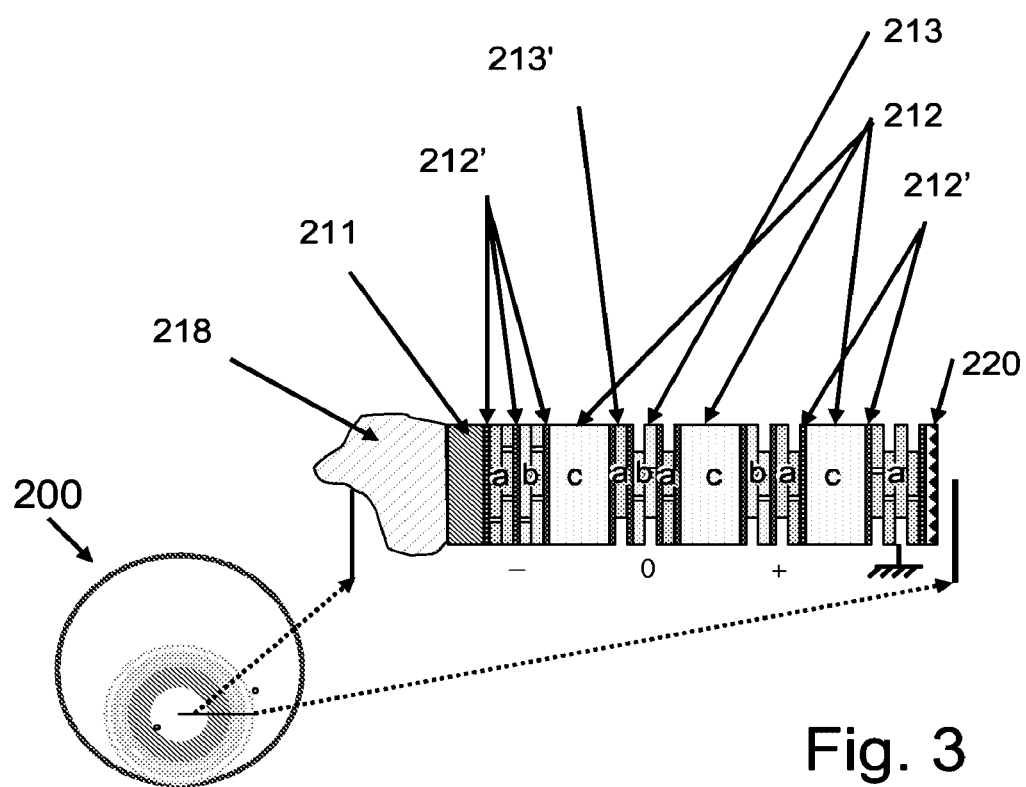
FIG. 3 shows a detailed cross-sectional view of the layers of the cable for the triaxial DC cable system of FIG. 2.

Preferred embodiments of a triaxial DC cable system are shown in FIG. 1 and FIG. 2. FIG. 1 shows a cross-sectional view of triaxial DC cable system according to the invention in a [+, −, 0, screen]-configuration whereas FIG. 2 shows a cross-sectional view of triaxial DC cable system according to the invention in a [−, 0, +, screen]-configuration. FIG. 3 shows a detailed cross-sectional view of the layers of the cable for the triaxial DC cable system of FIG. 2.

The two examples represent similar cable builds but with the poles, +, −, 0 plus screen differently arranged. Another possible build is to have only +, 0, screen or +, −, screen in combination with neutral. Yet other combinations can be envisioned having even more poles with different DC voltages, e.g. ±10 kV, ±20 kV, ±30 kV . . . , 0 and screen.

In the embodiments shown, the outer cross-sectional diameter of the cable ($d_{cab}$ in FIG. 1 and FIG. 2) is 70 mm (2.75") and the inner cross-sectional diameter of the thermal or cryogenic envelope $d_{ce}$ is 100 mm (3.9"). The relative mutual dimensions of the cross-sectional view are not drawn to scale.

In the following reference is made to FIG. 1, FIG. 2 and FIG. 3, quoting reference numerals "1xy; 2xy" from FIG. 1 and FIG. 2, respectively (1xy referring to details on FIGS. 1 and 2xy referring to equivalent details on FIG. 2, FIG. 3 being a detailed view of parts of FIG. 2 and hence comprising reference numerals 2xy). The cable system 100; 200 consists of a multipole or multiphase cable 101; 201 placed in a cryogenic envelope 116; 216. The complete cable system 100; 200 comprises a former 111; 211, electrical insulation 112; 212, power carrying layers 113; 213, a neutral layer 114; 214, a screen 115; 215, a cryogenic envelope 116; 216, cooling agent 117; 217, an optional void or filler 118; 218, optional diagnostics means 119; 219.

Former

The former 111; 211 can be of a single material or a combination of e.g. a metal, such as stainless steel, or a polymer but not limited to these. The former may be shaped as a spiral, an interlocked configuration, a smooth tube, a corrugated tube but not limited to these shapes. The former can also be built by a combination of different number of layers of before mentioned materials or structures.

Electrical Insulation

The electrical insulation 112; 212 located between concentrically arranged, electrically conducting layers 113; 213, 114; 214 and 115; 215 may be realised by winding of a ribbon-like insulation, e.g. Cryoflex™ or paper into a layered insulation (e.g. lapped PPLP), and e.g. by further impregnating this with an impregnating agent, e.g. $LN_2$ (Liquid Nitrogen). Alternatively, the insulation may be realised by an extruding process creating a solid insulation. Alternatively, a vacuum insulation between the individual electrical conductors could be used instead of an insulation layer of a certain thickness. In the detailed view of FIG. 3, electrically insulating layers 212 are shown to optionally further comprise layers 212'. Each electrically insulating layer 212 (denoted 'c' in FIG. 3) is advantageously flanked on the voltage side and on the ground side by a field smoothening semi-conducting layer 212'. This layer may e.g. consist of, but is not limited to, semiconducting Nomex™ (of DuPont), e.g. carbon loaded Nomex™, or nylon or an extruded semiconductor layer.

Superconductor

The power carrying layers 113; 213 typically consist of HTS tapes or wires (of BSCCO (e.g. $(Bi,Pb)_2Sr_2Ca_2Cu_3O_x$ (Bi-2223)), YBCO (Yttrium-Barium-Copper-Oxide, e.g. $YBa_2Cu_3O_7$) or other high temperature superconductors). In the present context, HTS stands for "High Temperature Superconductor" and designates superconducting materials having transition temperatures above 30 K In many cases it is advantageous that the HTS layers are electrically protected with a shunt which could be made of Cu or Al but not limited to these materials. This is illustrated in the detailed view of FIG. 3, where optional layers 213' of Cu (denoted 'a' in FIG. 3) are indicated between (1) the power carrying layers of HTS material 213 (denoted 'b' in FIG. 3) and (2) the electrically insulating layers 212 (denoted 'c' in FIG. 3) and/or the former 211. At present the cross section of the HTS tapes are 0.25 mm×4 mm (t×w). Independently of the HTS tapes, the shunt Cu tapes are of similar dimension. The shape and dimensions of the HTS tapes and the shunt Cu tapes are not limited to the presented numbers. The optional Cu layer(s) 213' for protection of the superconducting material against fault current may also have the function of mechanical reinforcement. The HTS layers can be built by applying e.g. a total of 60 tapes in two layers using e.g. American Superconductor tapes ($I_c$=120 A) (AMSC, Westborough, Mass. 01581, USA) or tapes of similar characteristics from EAS (European Advanced Superconductors Gmbh & Co. KG, Hanau, Germany), InnoST (Innova Superconductor Technology Co., Ltd., Beijing, China) or Sumitomo Electric Industries Co. (SEI, Japan). This number of tapes gives an overall layer $I_c$ of about 7 kA which corresponds to an $I_c$(rms) of roughly 5 kA(rms).

Neutral

The neutral conductor 114; 214 may be realised by HTS tapes/wires but may more economically be made of Cu or Al tapes and wires, but not limited to these materials. The total cross section of the shunt may be adapted to the local requirements for fault current protection. An example could be a peak current of 50 kA and a load current of 20 kA rms for 0.25 s. A sufficient protection would then be to have a shunt cross section of about 60-100 $mm^2$ of e.g. Cu.

Screen/Ground

The screen 115; 215 optionally provides for different functions such as electrical screening, electrical neutral, electrical grounding, mechanical reinforcement, fault current protection, and a means of reducing flow resistance of the cooling agent.

The screen 115; 215 may be built by using HTS tapes but is more economically realised by Cu or Al, but not limited to the mentioned materials. The screen acts as protection for the personnel and may optionally be grounded. The screen may also be dimensioned to act as a spare shunt in the event of a "phase" to ground short.

Thermal Envelope

The cryogenic envelope 116; 216 may be built as a rigid section as supplied by e.g. Cryotherm GmbH & Co. KG (Kirchen, Germany), or by flexible sections as supplied by e.g. Nexans Deutschland Industries GmbH & Co. KG (Kabelkamp, Hannover, Germany), however not limited to these suppliers or configurations. One embodiment of the thermal envelope may also be based on PU foam (Poly-Urethane) or aerogel-material in ambient pressure or under a partial vacuum.

Cooling Agent and Fluid Dielectric

The cooling agent 117; 217 is in the present embodiment typically $LN_2$ but is not limited to this. It can be any agent or gas that is viscous at cryogenic temperatures, e.g. liquid He, nitrogen gas, neon, hydrogen, oxygen or combinations thereof.

The central part 118; 218 of the cable 101; 201 (i.e. the interior of the tubular former 111; 211) is open to a variable range of uses. It may be filled with filler with no other function than to rigidize and reinforce the conductors and electrical insulation. It may stay void in order to be filled up with the cooling agent that can then be pressurized via the centre. The filler may e.g. be a polymer or pressurized $LN_2$. Yet another possible use is to have a parallel cooling channel, which may add to an increased pump/cooling length. Further, the interior may be instrumented with diagnostics means 119; 219.

Diagnostic Means

Diagnostics means 119; 219, e.g. in the form of a diagnostics cable, e.g. of an optical fibre type that monitors the temperature along the length or a part of the length of the cable system (e.g. distributed temperature measurements based on optical back-scattering). Another possible option is to place equidistant (but not limited to equidistant) discrete sensors for monitoring temperature, pressure and/or flow, etc.

Protective Layer

A protective and possibly mechanically reinforcing outer layer 120; 220 may be implemented with a low friction surface in order to facilitate the introduction of the conductor in the cryogenic envelope, if the conductor (as is possible in the present case) is produced independently of the cryogenic envelope.

Example 2

An AC Cable

Figure 4:
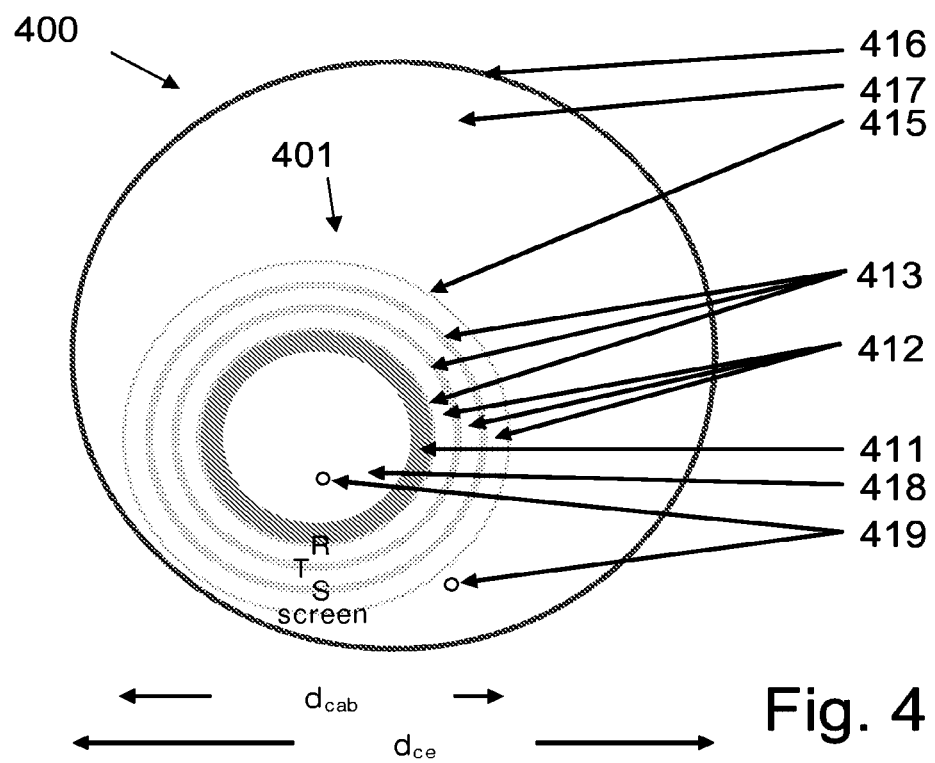
FIG. 4 shows a cross-sectional view of triaxial AC cable system according to the invention in a [R, T, S, screen]-configuration.
Figure 5:
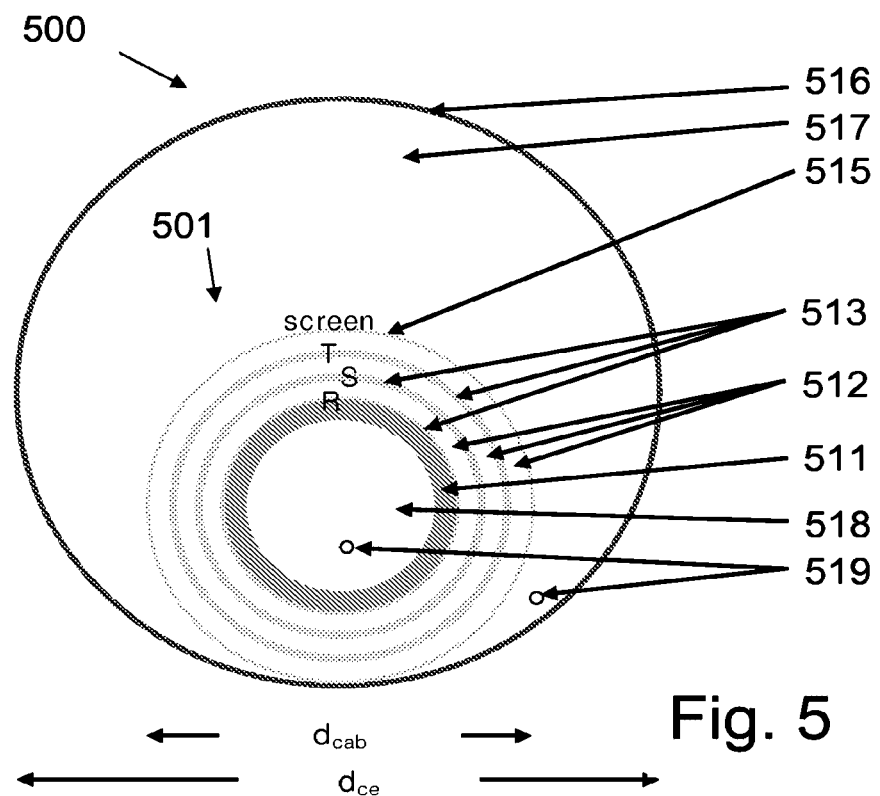
FIG. 5 shows a cross-sectional view of triaxial AC cable system according to the invention in a [R, S, T, screen]-configuration.
Figure 6:
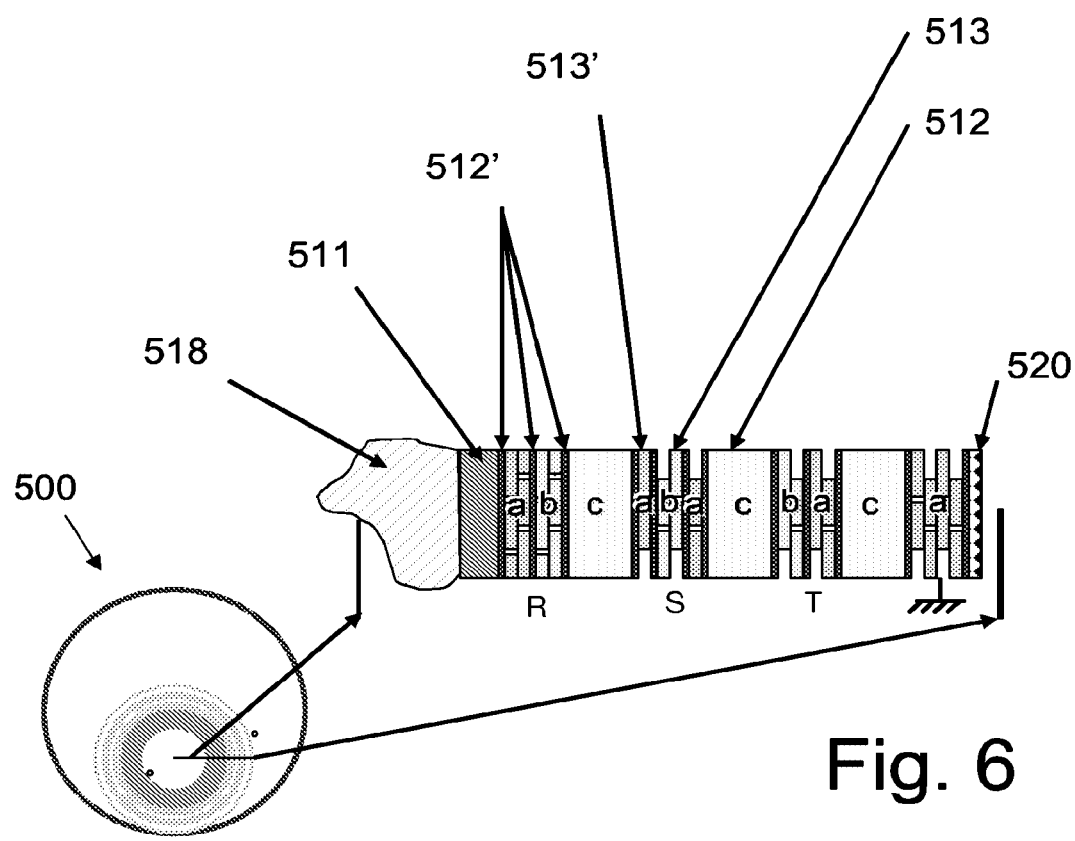
FIG. 6 shows a detailed cross-sectional view of the layers of the cable for the triaxial AC cable system of FIG. 5, FIG. 7 schematically illustrates a perspective view of cable system according to the invention wherein the cable meanders inside the thermal envelope in the longitudinal direction of the cable system.

Preferred embodiments of a three-phase AC cable system are shown in FIG. 4 and FIG. 5. FIG. 4 shows a cross-sectional view of triaxial AC cable system according to the invention in a [R, T, S, screen]-configuration. FIG. 5 shows a cross-sectional view of triaxial AC cable system according to the invention in a [R, S, T, screen]-configuration. FIG. 6 shows a detailed cross-sectional view of the layers of the cable for the triaxial AC cable system of FIG. 5.

In the following reference is made to FIG. 4, FIG. 5 and FIG. 6, quoting reference numerals "4xy; 5xy" from FIG. 4 and FIG. 5, respectively (4xy referring to details on FIGS. 4 and 5xy referring to equivalent details on FIG. 5, FIG. 6 being a detailed view of parts of FIG. 5 and hence comprising reference numerals 5xy).

The two examples of FIG. 4 and FIG. 5 represent similar cable builds but with the phases differently permuted R, S, T and R, T, S, respectively.

The cable 401; 501 consists of a multipole or multiphase conductor placed in a cryogenic envelope 416; 516. The complete cable system 400; 500 comprises a former 411; 511, electrical insulation 412; 512, power carrying layers 413; 513, a screen 415; 515 optionally combined with a neutral layer, a cryogenic envelope 416; 516, a cooling agent 417; 517, void or filler 418; 518, diagnostics means 419; 519.

Features 4xy, 5xy of the AC-cable system embodiments correspond to similar features 1xy, 2xy of the DC-cable system embodiments described in Example 1. The same characteristics as described in Example 1 for elements of a DC-cable system are generally valid for the corresponding elements of an AC-cable system (e.g. the characteristics of former 111, 211 of the DC-cable systems are identical to the characteristics of former 411, 511 of the AC-cable systems). Basically, this is one of the advantageous features of the multi-phase-concept that it can without any changes in design be used for both AC and DC.

Dielectric

The electrical insulation 412; 512 may be realised by winding a ribbon-like insulation, e.g. Cryoflex™ into a layered insulation and by impregnating this with the cooling agent, e.g. $LN_2$, or optionally with another agent. Further, the insulation may be realised by an extruding process creating a solid insulation. In the detailed view of FIG. 6, electrically insulating layer 512 (denoted 'c' in FIG. 6) is preferably flanked on the voltage side and on the ground side by a field smoothening semi-conducting layer 512'. This layer may e.g. consist of semi-conducting Nomex™ or nylon or metallized Cryoflex™ or an extruded semiconductor layer.

Over-Current Protection

In the detailed view of FIG. 6, optional layers 513' of Cu (denoted 'a' in FIG. 6) are indicated between (1) the power carrying layers of HTS material 513 (denoted 'b' in FIG. 6) and (2) the electrically insulating layers 512 (denoted 'c' in FIG. 6) and/or the former 511.

In the detailed view of FIG. 6, the power carrying layers/phases 513 (denoted 'b' in FIG. 6) of HTS tapes/wires are combined with an optional shunting layer 513' comprising an electrically conducting material, e.g. in the form of Cu or Al tapes/wires. The total cross section of the shunt may be adapted to the local requirements for fault current protection. An example could be a peak current of 50 kA and a load current of 20 kA rms for 0.25 s. A sufficient protection in this case would then be to have a shunt cross section of about 60-100 mm² of e.g. Cu.

Advantages of the Embodiments Described in Examples 1 and 2

The embodiments discussed above and illustrated in FIGS. 1-6 have the advantages of relative production ease and flexibility of a circular symmetric conductor system compared to the merging of a shaped phase conductor and production of multiphase conductor of the triad type. For example, with this invention, one complete cable circuit (including all the system phases or poles) can be transported on a single drum and installed in a single pull with simple equipment. A Triad system needs to have the three single-phase cables either inserted into three separate cryostats, twisted together on a planetary strander resulting in a low packing factor on a transportation drum, or installed using a planetary de-coiler, which is larger and more expensive than an ordinary jack stand. The present invention is also more compact in transport than a centered Triaxial design, due to the absence of centering spacers.

Modularity and flexibility are intrinsic and goes hand in hand in the circular symmetry, thus production facility and thereby a lower cost is an implication.

Synergy between cables used for AC and DC are possible, since the same cable can be used without any modifications for e.g. an AC cable of nominal max current of 5 kA(rms) (corresponds to an $I_c$=7 kA) would typically be ascribed a rated 3 phase AC current of 3.5-4 kA or a 5-6 kA DC cable ($\sqrt{2}$ more). This can be obtained with no modification needed in the production process.

The possibility of producing and installing conductor and cryogenic envelope independently adds increased flexibility and opens for a variety of retrofit applications by providing flexibility in areas such as 1. customer requirements, 2. production and material aspects, 3. modularity and 4. multiple vendor involvement.

Running the above mentioned cable at rated AC current (i.e. 70-80% of nominal max will typically result in an electrical loss dissipation of the order 1-2 W/m (A nominal max would typically correspond to a measured critical current (as defined by the 1 microvolt/centimeter criteria), which in the ac case would be divided by $\sqrt{2}$. However, in order to have a margin accounting for mechanical degradation and engineering mistakes one would like to be on the safe side by at least 20%, so 80% of nominal maximum current). The losses have their origin in the fact that the magnetic self-field is forced to move through the superconducting material (so-called hysteretic losses). However, the losses are significantly lower than an equivalent conventional cable. In fact the low losses enables insulation thicknesses that covers low voltage and up to medium range voltages.

The power carrying capacity of a superconducting triax cable is significantly increased compared with a conventional Cu or Al cable.

A DC cable of max current ($I_c$) 7 kA would typically be able to be exploited to the full $I_c$, thus a rating of 5-6 kA is not a problem. Operating a superconductor in the DC mode is more favourable as this can be regarded as the intrinsic way of operating the superconductor, i.e. in this case the losses are negligible. For a cable with $I_c$=7 kA and having a typical (or even conservative) n-value of 10, Usually the current versus voltage (I-V) characteristics of a superconductive cable can be approximated with a power function $k \cdot 1^n$ where the n-value is the exponent (power), i.e. it says something about the steepness of the transition to the normal state. Operating the cable at rated 6 kA (85% of true $I_c$) causes a loss dissipation of only $0.85^{10} \times 0.7 = 0.13$ W/m. With realistic n-values that are higher and operating the cable further below the $I_c$ the losses just become negligible and orders of magnitude better than in the AC case. I.e. the limiting pump length is only determined by pump hydraulics and the thermal losses of the cryogenic envelope.

Running DC with a [+, −, 0, screen] configuration is well suited for use at a converter station, especially the inversion to AC as the zero/neutral of the DC system can easily be adopted by the AC system. Creating AC from DC is more readily done by connecting to a ±U source rather than a +2U, 0 source.

Fault current protection is also similar for the AC and DC cable.

Figure 7:
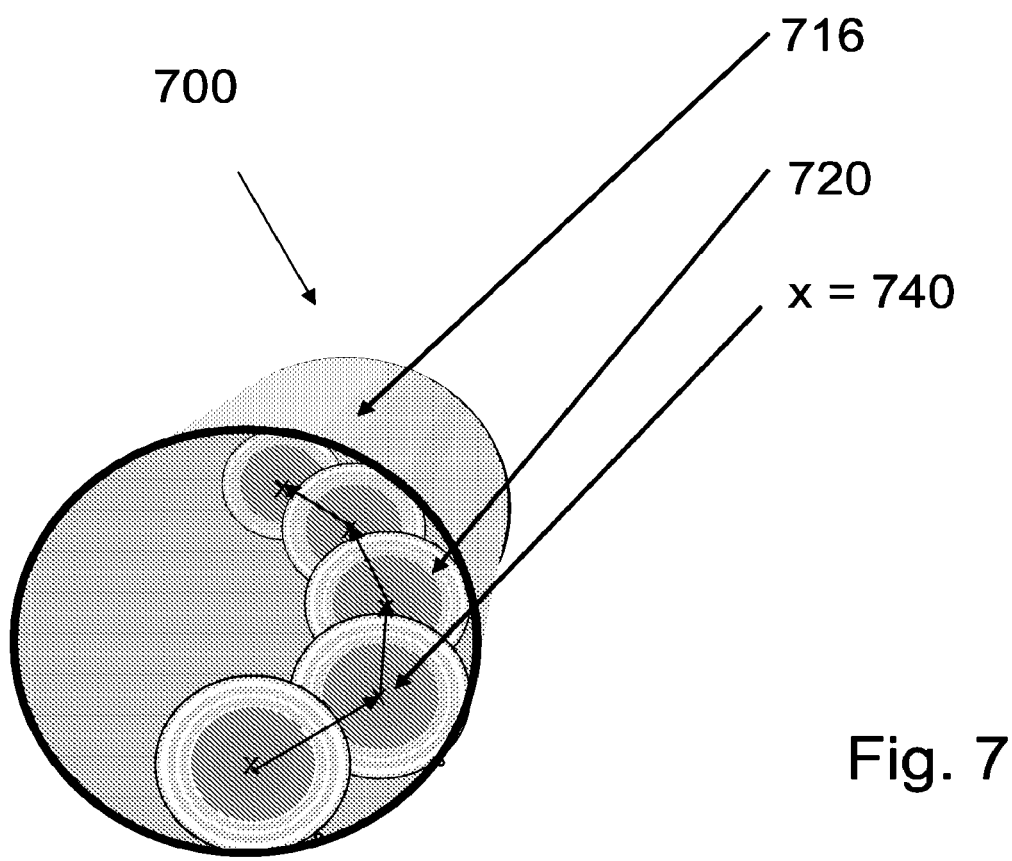
Figure 8A:
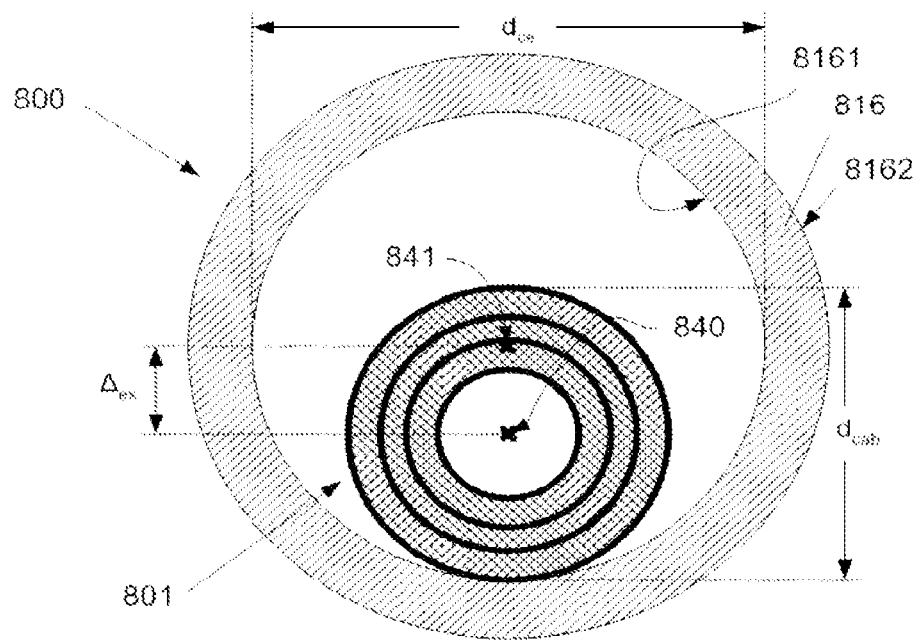
FIGS. 8a-8b show a fluid cooled high-voltage cable system according to the invention, FIG. 8a in a concentrically arranged 3 phase configuration with a common electrical screen and FIG. 8b in a side-by-side arranged three phase configuration with a common electrical screen.
Figure 8B:
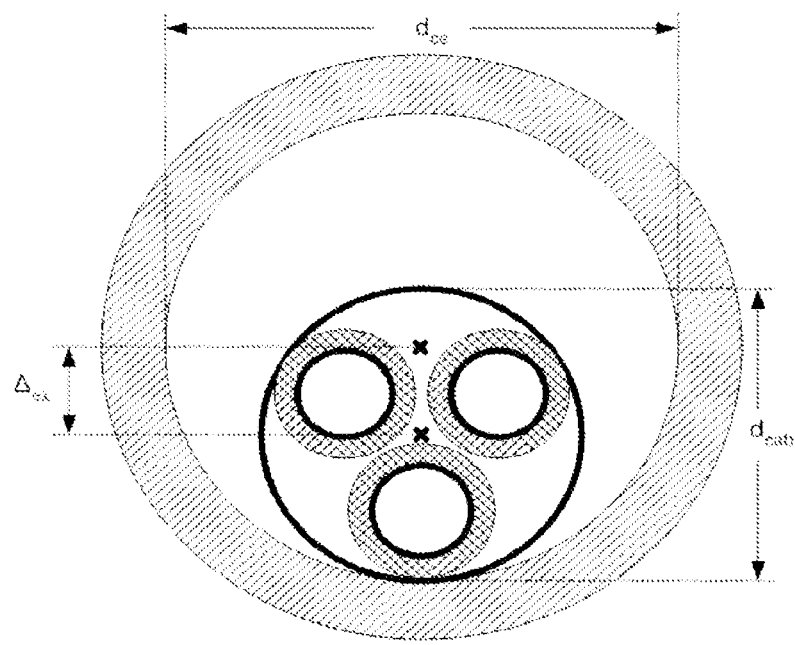

FIG. 7 schematically illustrates a perspective view of cable system according to the invention wherein the cable meanders inside the thermal envelope in the longitudinal direction of the cable system.

The placement of the cable 720 in the cryogenic envelope 716 is preferably arranged so that the trace of the centre (denoted 'x' in FIG. 7) of the conductor is always eccentric with respect to the centre of the cryogenic envelope and such that the trace makes a spiralling track. The spiralling of the cable with respect to the cryogenic envelope along its longitudinal direction ensures an extra length of the cable with respect to the cryogenic envelope that can act as a thermal compensation on cool-down and warm-up of the cable. Further, the eccentricity provides a smaller flow resistance to a flowing cooling agent than in a coaxial configuration. The eccentricity does not introduce any eddy currents even in case of current imbalance. Alternatively, the cable may be eccentrically located with respect to the centre of the cryogenic envelope over certain parts of its length, such as over a majority of its length.

The cable 720 may e.g. embodied by DC-cables 101 and 201 of FIGS. 1 and 2, respectively, or by AC-cables 401, 501 of FIGS. 4 and 5, respectively.

Figure 9C:
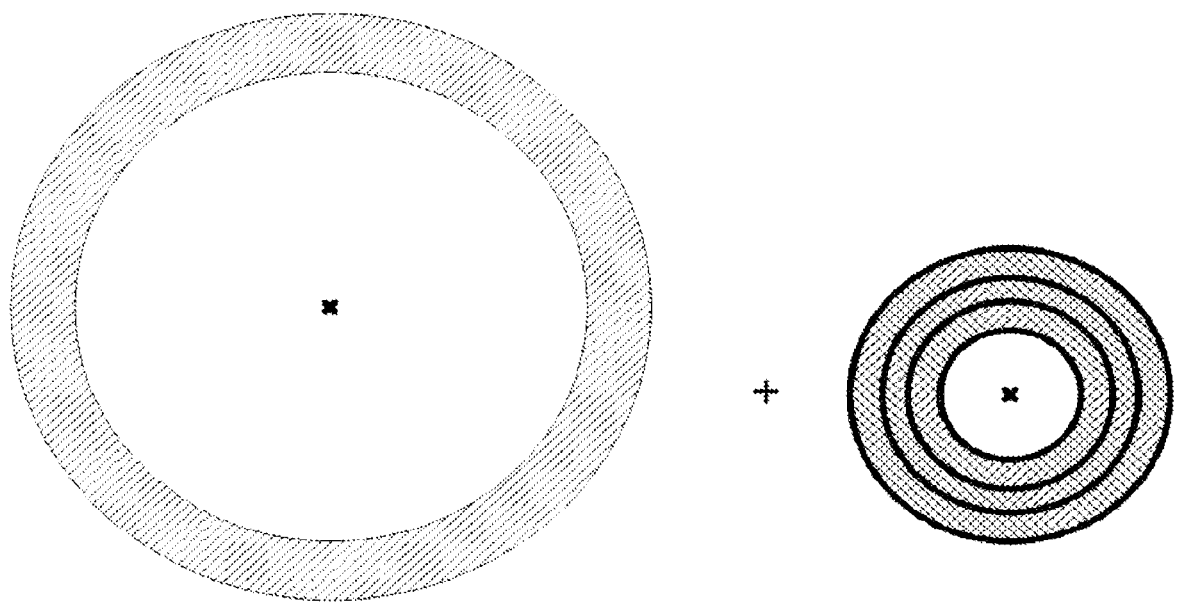
Figure 9C:
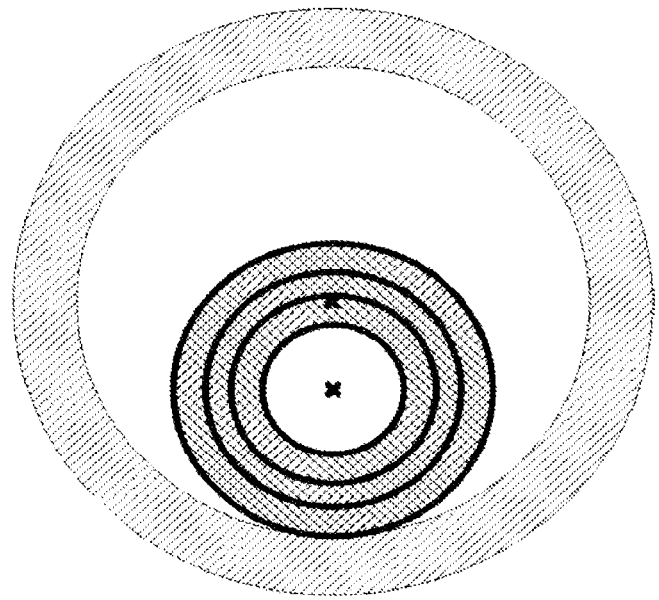

Method of Manufacturing:

FIG. 9 shows a method of manufacturing a cable system according to the invention, FIGS. 9a-9c being cross sectional views of the thermal insulation, the cable and the assembled cable system, respectively.

FIG. 9 schematically illustrates one of the advantages of the present invention, the option of manufacturing the thermal envelope 916 (FIG. 9a) and the cable 901 (FIG. 9b) in separate processing steps performed in parallel or sequentially at the same or at different processing facilities and to assemble thermal envelope and cable to a cable system 900 (FIG. 9c) at the time and location of convenience in the situation in question. Cable and thermal envelope may e.g. be manufactured by different producers and shipped to one of the producers, to a third party assembly house or to the location where the cable is to be installed for on-site assembly (if desirable).

In a preferred embodiment, the method of manufacturing a superconductive cable system comprises providing separately manufactured cable and thermal envelopes and make the assembly according to the following steps: 1. Apply a tensile stress on thermal envelopes thereby stretching them e.g. 0.05-0.5% during the insertion of the cable; 2. Cool the cable to liquid $N_2$ temperature, causing it to contract longitudinally e.g. by 0.1-0.4%; 3. Pressurize the thermal envelope 3 bars or 10 bars or 20 bars so as to cause an elongation of the inner cryostat wall; 4. Push the cable into thermal envelope; 5. Force the thermal envelope to meander or bend in multiple locations such as every 1.5 m or every 3 m or every 10 m; 6. Fix the cable ends at the ends of the thermal envelope; 7. Subsequently release the pressure of the thermal envelope; 8. subsequently release the tensile stress on the thermal envelope; 9. subsequently allow the cable to warm up, the cable expanding on heating; 10. subsequently stop pushing the cable into thermal envelope.

Figure 10A:
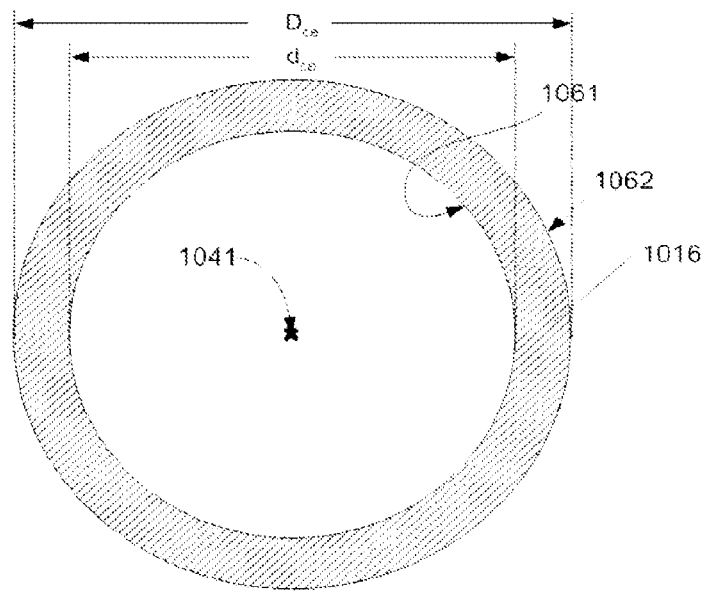
Figure 10B:
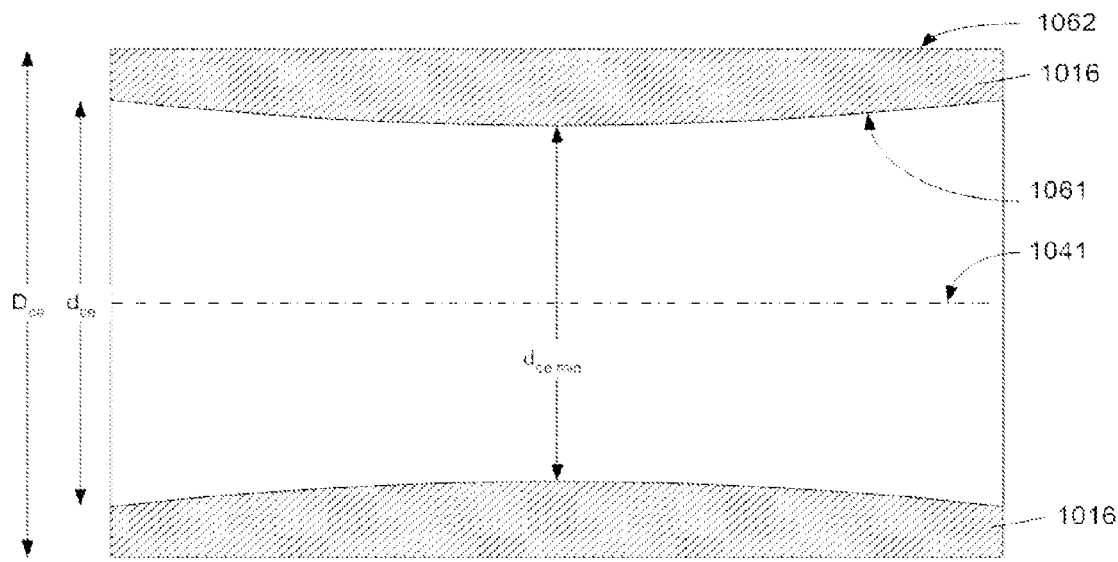

FIG. 10 schematically shows cross sectional views of the thermal envelope or cryostat 1016, FIG. 10a showing a transverse cross section and FIG. 10b a longitudinal cross section where the inner cryostat wall 1061 is curved, representing a situation during installation as discussed above.

As shown in FIG. 10b, the inner cryostat wall 1061 can "undulate" along the length of the cryostat to give an over-length which may compensate for its thermal contraction during cooling of the system. However, the outer cryostat wall 1062 is generally always 'warm', and will keep about the same length. The "undulation" of the inner cryostat is optional. It could also include bevelled (corrugated) sections such as used in a rigid cryostat, for example. It is to be understood that the eccentricity of the cable when placed in the cryostat is taken relative to the centre line 1041 being the geometrical centre of the outer cryostat wall 1062 in all transversal cross sections along its length, typically constituting substantially a straight line. The maximum cross sectional dimension of the outer crystal wall $D_{ce}$ is indicated in FIG. 10 and exemplified as a constant (diameter) over its length, which is preferred. This need not always be the case, however. The outer diameter may vary along the length (e.g. over specific parts of its length) and/or be of a non-circular cross-sectional form. The maximum $d_{ce,max}$ and minimum $d_{ce,min}$ cross-sectional dimensions of the inner cryostat wall are indicated in FIG. 10 and exemplified as being located at the longitudinal ends and at the centre midway between the ends, respectively. This need not be the case, however. The shape of the inner cryostat wall may take other forms than illustrated in FIG. 10b, such as substantially sinusoidal or some other more randomly undulating form determined by the length and difference in length of the inner and outer wall sections, the materials from which they are made, the intermediate thermally insulating material 1016, the ambient temperature, etc.

Figure 11A:
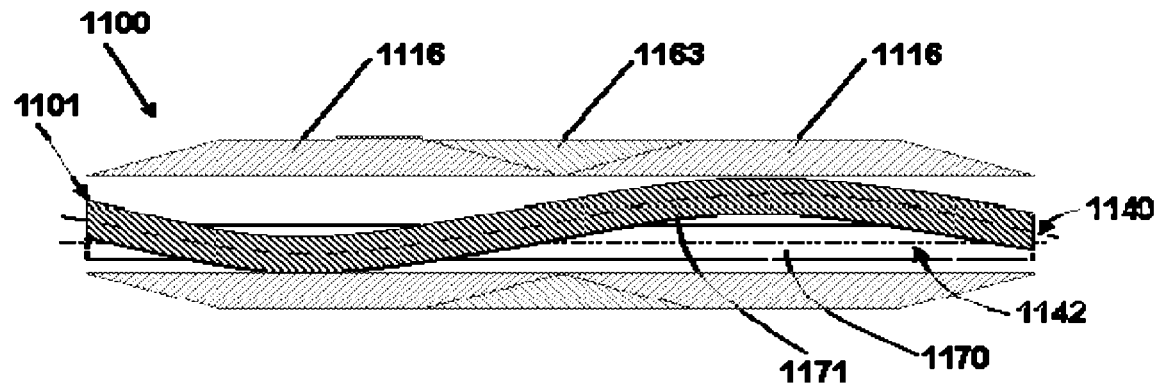
Figure 11B:
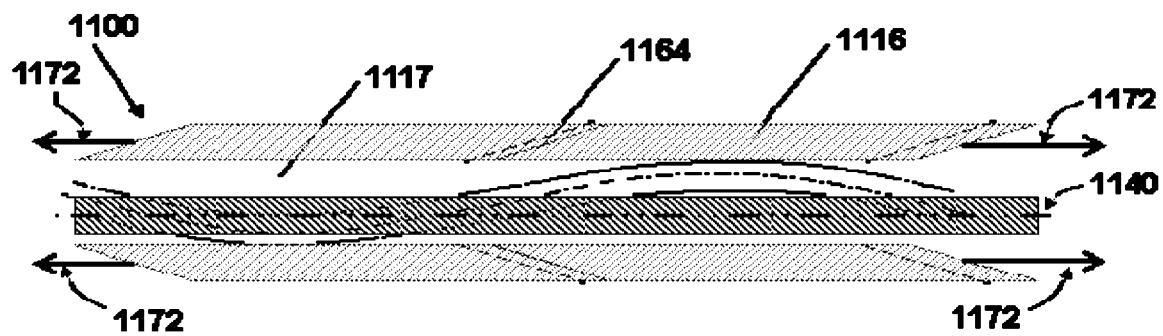
Figure 11C:
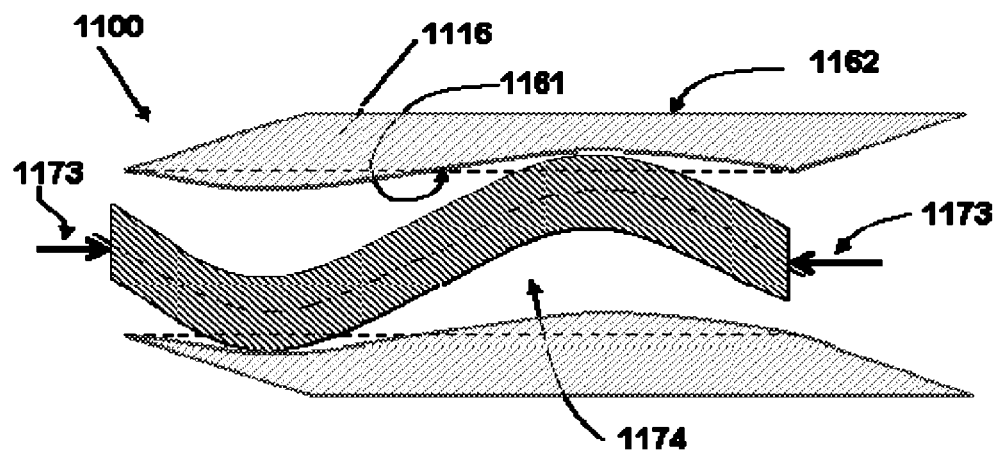

FIG. 11 schematically shows the longitudinal section of a cable system, 1100, containing a number of functionally integral thermal envelopes, 1116, that is larger than the number of cable conductor assemblies, 1101. These thermal envelopes are joined through an independent joint element, 1163, or through joints 1164 that are integrated in each thermal envelope section. FIG. 11a shows how the cable conductor 1170 is cooled and thereby assumes a shortened path, 1142. Upon subsequent fixing at the ends and warming, the cable conductor assembly, 1171, assumes a longer, undulating path described by the center line 1140. FIG. 11b describes a pulling force, 1172, being applied to the thermal envelope, thereby extending its length. Upon fixture of the cable ends with respect to the ends of the thermal envelope, and release of the pulling force 1172, the thermal envelope shortens, and forces the cable conductor assembly into an undulating centreline path, 1140. FIG. 11c describes how the cable conductor ends are pushed by a force 1173, into the ends of the cryostat resulting in a longer and undulating path of the cable conductor centreline. An overpressure, 1174, is applied to the cooling channel, 1117, resulting in an extension of the length of the inner cryostat wall, 1161. This allows an even larger length of cable conductor to be inserted into the thermal envelope, 1116. In the present embodiment, the outer wall 1162 of the thermal envelope is shown to remain substantially unaffected by the changes to the inner wall.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

The invention claimed is:
1. A method of manufacturing a superconductive single-phase or multi-phase cable system comprising the steps of
   a) providing at least two electrical conductors in the form of at least one electrical phase conductor and a neutral conductor,
   b) providing that said electrical conductors are mutually electrically insulated from each other in a cable,
   c) providing a tubular thermal insulation surrounding the electrical conductors, said tubular thermal insulation defining a central longitudinal axis,
   d) providing that the inner surface of said tubular thermal insulation forms the radial limitation of a cooling chamber for holding a cooling fluid for cooling said electrical conductors, and
   e) providing that said at least one electrical phase conductor and neutral conductor are arranged eccentrically relative to said central longitudinal axis,
   the method further comprising, during installation of the cable inside the tubular thermal insulation by introducing an over-length of the cable with respect to the tubular thermal insulation, two or more of the following steps S1-S10:
   S1. Apply a tensile stress on the tubular thermal insulation thereby stretching it;
   S2. Cool the cable to liquid $N_2$ temperature, causing it to contract longitudinally;
   S3. Pressurize the tubular thermal insulation to at least 3 bars so as to cause an elongation of the inner wall of the tubular thermal insulation;
   S4. Push the cable into the tubular thermal insulation;
   S5. Force the tubular thermal insulation to meander or bend in multiple locations through bending it and fixing it to the ground;
   S6. Fix the cable ends at the ends of the tubular thermal insulation;
   S7. Subsequently release the pressure of the tubular thermal insulation;
   S8. Subsequently release the tensile stress on the tubular thermal insulation;
   S9. Subsequently allow the cable to warm up, the cable expanding on heating;
   S10. Subsequently stop pushing the cable into the tubular thermal insulation.

2. A method according to claim 1 wherein said cable comprising said electrical conductors and their mutual electrical insulation is manufactured separately from said tubular thermal insulation.

3. A method according to claim 1 wherein said cable comprising said electrical conductors and their mutual electrical insulation is manufactured in parallel with said tubular thermal insulation.

4. A method according to claim 1 or 2 wherein said cable and said tubular thermal insulation are manufactured in separate sections of length $L_{cab}$ and $L_{TE}$, respectively, wherein $L_{cab}$ is larger than $L_{TE}$.

5. A cable system according to claim 4 wherein $L_{cab}$ is substantially equal to $n*L_{TE}$, where n is an integer larger than 1.

6. A method according to claim 4 wherein said tubular thermal insulation is provided in sections of standardized lengths.

7. A method according to claim 4 wherein said tubular thermal insulation is provided as a mixture of flexible, rigid straight and rigid bent sections, or sections that are partially rigid and partially flexible.

8. A method according to claim 1 comprising the steps S1, S6, S8.

9. A method according to claim 1 comprising the steps S2, S6, S9.

10. A method according to claim 1 comprising the steps S3, S6, S7.

11. A method according to claim 1 comprising the steps S2, S6, and subsequently release a tensile stress on the tubular thermal insulation.

* * * * *